(12) United States Patent
Yu et al.

(10) Patent No.: US 11,573,015 B2
(45) Date of Patent: **\*Feb. 7, 2023**

(54) SPLIT DEHUMIDIFICATION SYSTEM WITH SECONDARY EVAPORATOR AND CONDENSER COILS

(71) Applicant: THERMA-STOR LLC, Madison, WI (US)

(72) Inventors: Weizhong Yu, Cottage Grove, WI (US); Steven S. Dingle, Madison, WI (US); Scott E. Sloan, Sun Prairie, WI (US); Todd R. DeMonte, Cottage Grove, WI (US); Grant M. Lorang, Lake Mills, WI (US); Timothy S. O'Brien, DeForest, WI (US)

(73) Assignee: THERMA-STOR LLC, Madison, WI (US)

( * ) Notice: Subject to any disclaimer, the term of this patent is extended or adjusted under 35 U.S.C. 154(b) by 98 days.

This patent is subject to a terminal disclaimer.

(21) Appl. No.: 17/197,639

(22) Filed: Mar. 10, 2021

(65) Prior Publication Data

US 2021/0190336 A1 Jun. 24, 2021

Related U.S. Application Data

(63) Continuation-in-part of application No. 16/234,052, filed on Dec. 27, 2018, now Pat. No. 10,955,148, (Continued)

(51) Int. Cl.
*F24F 3/14* (2006.01)
*F25B 5/04* (2006.01)
(Continued)

(52) U.S. Cl.
CPC .............. *F24F 3/1405* (2013.01); *F25B 5/04* (2013.01); *F25B 6/04* (2013.01); *F25B 41/42* (2021.01);
(Continued)

(58) Field of Classification Search
CPC .......... F24F 1/0063; F24F 1/0083; F24F 3/153
See application file for complete search history.

(56) References Cited

U.S. PATENT DOCUMENTS

| | | |
|---|---|---|
| 2,982,523 A | 5/1961 | McFarlan |
| 4,581,367 A | 4/1986 | Schromm et al. |
| (Continued) | | |

FOREIGN PATENT DOCUMENTS

| | | |
|---|---|---|
| EP | 3673966 A1 | 7/2020 |
| EP | 3674615 A1 | 7/2020 |
| (Continued) | | |

OTHER PUBLICATIONS

European Patent Office, European Extended Search Report, Application No. 19219703.6, dated May 15, 2020. 8 pages.
(Continued)

*Primary Examiner* — Henry T Crenshaw
(74) *Attorney, Agent, or Firm* — Baker Botts L.L.P.

(57) ABSTRACT

A dehumidification system includes a compressor, a primary evaporator, a primary condenser, a secondary evaporator, and a secondary condenser. The secondary evaporator receives an inlet airflow and outputs a first airflow to the primary evaporator. The primary evaporator receives the first airflow and outputs a second airflow to the secondary condenser. The secondary condenser receives the second airflow and outputs a third airflow to the primary condenser. The primary condenser receives the third airflow and outputs a dehumidified airflow. The compressor receives a flow of refrigerant from the primary evaporator and provides the flow of refrigerant to the primary condenser.

20 Claims, 23 Drawing Sheets

Related U.S. Application Data which is a continuation-in-part of application No. 15/460,772, filed on Mar. 16, 2017, now Pat. No. 10,168,058.

(51) Int. Cl.

| | | |
|---|---|---|
| *F25B 6/04* | (2006.01) | |
| *F25B 41/42* | (2021.01) | |
| *G05D 7/06* | (2006.01) | |
| *F28F 13/00* | (2006.01) | |

(52) U.S. Cl.
CPC .......... *F28F 13/00* (2013.01); *G05D 7/0617* (2013.01); *F24F 2003/1446* (2013.01); *F24F 2003/1452* (2013.01); *F25B 2700/13* (2013.01); *F25B 2700/1332* (2013.01)

(56) References Cited

U.S. PATENT DOCUMENTS

| | | | |
|---|---|---|---|
| 5,333,470 A | 8/1994 | Dinh | |
| 5,613,372 A | 3/1997 | Beal et al. | |
| 5,752,389 A * | 5/1998 | Harper ................. | F24F 3/153 62/176.5 |
| 6,109,044 A * | 8/2000 | Porter ................ | F28D 15/0266 62/96 |
| 6,644,049 B2 | 11/2003 | Alford | |
| 6,688,137 B1 * | 2/2004 | Gupte .................. | F28F 9/0265 62/515 |
| 6,826,921 B1 | 12/2004 | Uselton | |
| 7,290,399 B2 | 11/2007 | Taras et al. | |
| 10,845,069 B2 | 11/2020 | Sloan et al. | |
| 10,921,002 B2 | 2/2021 | Dingle et al. | |
| 2003/0196445 A1 * | 10/2003 | Cho ....................... | F25B 41/20 62/197 |
| 2004/0040322 A1 * | 3/2004 | Engel ................... | F24F 3/1405 62/177 |
| 2006/0218949 A1 * | 10/2006 | Ellis ........................ | F24F 3/153 62/173 |
| 2008/0104974 A1 | 5/2008 | Dieckmann et al. | |
| 2010/0275630 A1 | 11/2010 | DeMonte et al. | |
| 2012/0234026 A1 | 9/2012 | Oh et al. | |
| 2015/0159920 A1 | 6/2015 | Ha et al. | |
| 2018/0266709 A1 | 9/2018 | Tucker et al. | |
| 2018/0361828 A1 | 12/2018 | Kato et al. | |
| 2019/0128543 A1 | 5/2019 | Dingle et al. | |
| 2019/0128544 A1 | 5/2019 | Sloan et al. | |
| 2019/0137122 A1 | 5/2019 | Dingle et al. | |
| 2021/0055009 A1 | 2/2021 | Zhou | |

FOREIGN PATENT DOCUMENTS

| | | |
|---|---|---|
| JP | 2008196811 A | 8/2008 |
| JP | 2015175533 A | 10/2015 |
| KR | 20000073049 A | 12/2000 |
| WO | 03104719 A1 | 12/2003 |

OTHER PUBLICATIONS

Patent Cooperation Treaty, International Search Report and the Written Opinion of the International Searching Authority, or the Declaration, in International Application No. PCT/US2018/018265, dated May 4, 2018.
Canadian Intellectual Property Office, Innovation, Science and Economic Development Canada, Communication regarding Application No. 2,995,049, dated Jun. 18, 2018.
Canadian Intellectual Property Office, Canadian Office Action, Application No. 2,995,049, dated Sep. 6, 2018, 5 pages.
IP Australia, Examination Report No. 1 for Standard Patent Application, Application No. 2018200855, dated Feb. 24, 2022, 3 pages.
Japan Patent Office, Office Action, Decision to Refuse, Application No. 2019-235379, dated Jan. 11, 2022, 10 pages.
Extended European Search Report, Application No. 22156527.8, dated Jul. 27, 2022.

* cited by examiner

SPLIT DEHUMIDIFICATION SYSTEM WITH SECONDARY EVAPORATOR AND CONDENSER COILS

CROSS-REFERENCE TO RELATED APPLICATIONS

The present application is a continuation-in-part which claims priority to U.S. Non-provisional application Ser. No. 16/234,052 filed Dec. 27, 2018 by Steven S. Dingle et al. and entitled "SPLIT DEHUMIDIFICATION SYSTEM WITH SECONDARY EVAPORATOR AND CONDENSER COILS", which claims priority to U.S. Non-provisional application Ser. No. 15/460,772 filed Mar. 16, 2017 by Dwaine Walter Tucker et al. and entitled "DEHUMIDIFIER WITH SECONDARY EVAPORATOR AND CONDENSER COILS," now U.S. Pat. No. 10,168,058 issued Jan. 1, 2019, which are hereby incorporated by reference as if reproduced in their entirety.

TECHNICAL FIELD

This invention relates generally to dehumidification and more particularly to a dehumidifier with secondary evaporator and condenser coils.

BACKGROUND OF THE INVENTION

In certain situations, it is desirable to reduce the humidity of air within a structure. For example, in fire and flood restoration applications, it may be desirable to quickly remove water from areas of a damaged structure. To accomplish this, one or more portable dehumidifiers may be placed within the structure to direct dry air toward water-damaged areas. Current dehumidifiers, however, have proven inefficient in various respects.

SUMMARY OF THE INVENTION

According to embodiments of the present disclosure, disadvantages and problems associated with previous systems may be reduced or eliminated.

In certain embodiments, a dehumidification system comprises a dehumidification unit comprising a primary metering device, a secondary metering device, and a secondary evaporator. The secondary evaporator operable to receive a flow of refrigerant from the primary metering device; and receive an inlet airflow and output a first airflow, the first airflow comprising cooler air than the inlet airflow, the first airflow generated by transferring heat from the inlet airflow to the flow of refrigerant as the inlet airflow passes through the secondary evaporator. The dehumidification unit further comprises a primary evaporator operable to receive the flow of refrigerant from the secondary metering device and receive the first airflow and output a second airflow, the second airflow comprising cooler air than the first airflow, the second airflow generated by transferring heat from the first airflow to the flow of refrigerant as the first airflow passes through the primary evaporator. The dehumidification unit further comprises a secondary condenser operable to receive the flow of refrigerant from the secondary evaporator and receive the second airflow and output a third airflow, the third airflow comprising warmer air with a lower relative humidity than the second airflow, the third airflow generated by transferring heat from the flow of refrigerant to the third airflow as the second airflow passes through the secondary condenser. The dehumidification unit further comprises a compressor operable to receive the flow of refrigerant from the primary evaporator and provide the flow of refrigerant to a primary condenser, the flow of refrigerant provided to the primary condenser comprising a higher pressure than the flow of refrigerant received at the compressor. The dehumidification system further comprises a condenser unit comprising the primary condenser operable to receive the flow of refrigerant from the compressor and transfer heat from the flow of refrigerant to a fourth airflow as the fourth airflow contacts the primary condenser.

Certain embodiments of the present disclosure may provide one or more technical advantages. For example, certain embodiments include two evaporators, two condensers, and two metering devices that utilize a closed refrigeration loop. This configuration causes part of the refrigerant within the system to evaporate and condense twice in one refrigeration cycle, thereby increasing the compressor capacity over typical systems without adding any additional power to the compressor. This, in turn, increases the overall efficiency of the system by providing more dehumidification per kilowatt of power used. The lower humidity of the output airflow may allow for increased drying potential, which may be beneficial in certain applications (e.g., fire and flood restoration).

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

In certain situations, it is desirable to reduce the humidity of air within a structure. For example, in fire and flood restoration applications, it may be desirable to remove water from a damaged structure by placing one or more portable dehumidifiers unit within the structure. As another example, in areas that experience weather with high humidity levels, or in buildings where low humidity levels are required (e.g., libraries), it may be desirable to install a dehumidification unit within a central air conditioning system. Furthermore, it may be necessary to hold a desired humidity level in some commercial applications. Current dehumidifiers, however, have proven inadequate or inefficient in various respects.

To address the inefficiencies and other issues with current dehumidification systems, the disclosed embodiments provide a dehumidification system that includes a secondary evaporator and a secondary condenser, which causes part of the refrigerant within the multi-stage system to evaporate and condense twice in one refrigeration cycle. This increases the compressor capacity over typical systems without adding any additional power to the compressor. This, in turn, increases the overall efficiency of the system by providing more dehumidification per kilowatt of power used.

Figure 1:
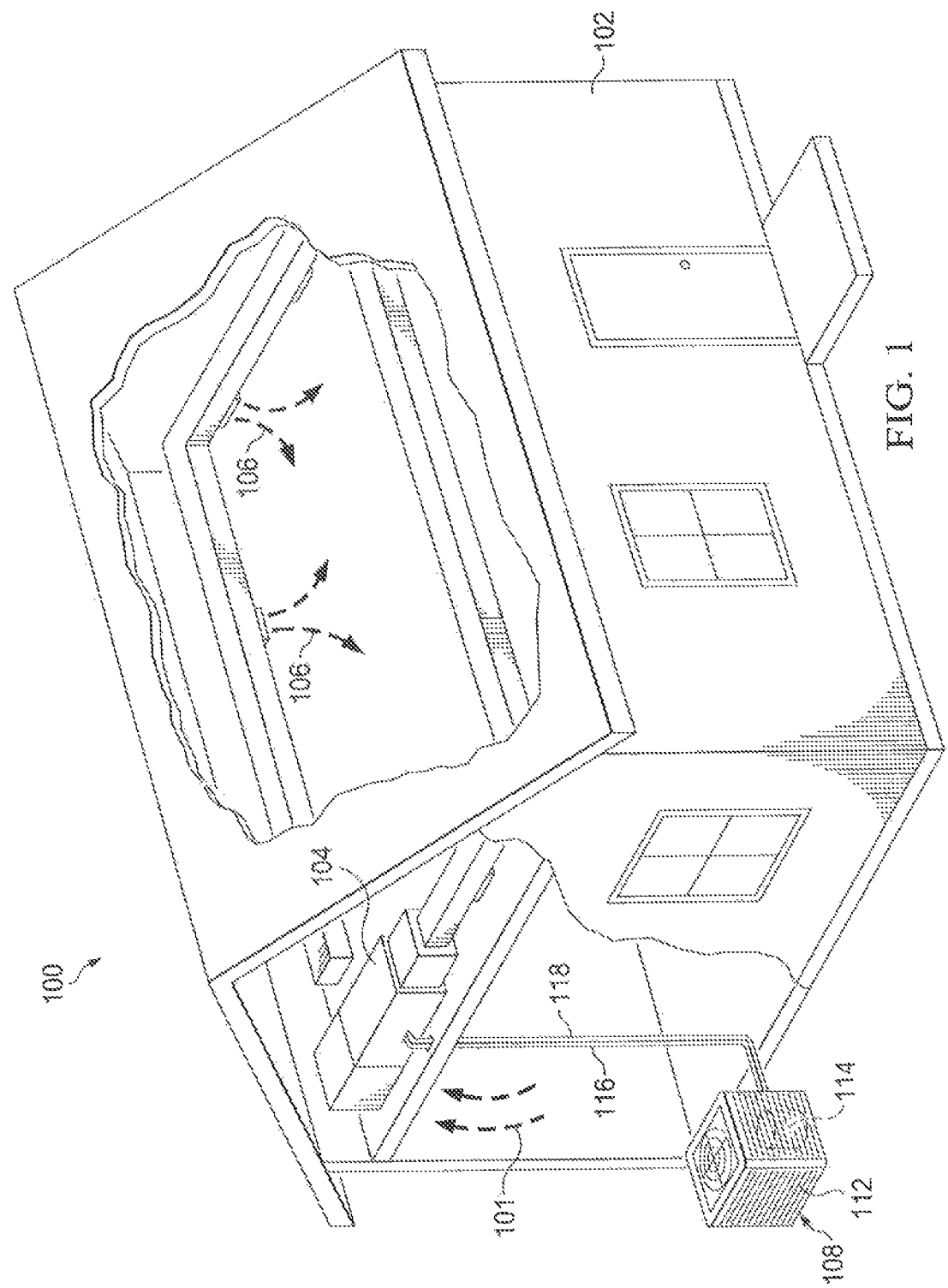
FIG. 1 illustrates an example split system for reducing the humidity of air within a structure, according to certain embodiments.

FIG. 1 illustrates an example dehumidification system 100 for supplying dehumidified air 106 to a structure 102, according to certain embodiments. Dehumidification system 100 includes an evaporator system 104 located within structure 102. Structure 102 may include all or a portion of a building or other suitable enclosed space, such as an apartment building, a hotel, an office space, a commercial building, or a private dwelling (e.g., a house). Evaporator system 104 receives inlet air 101 from within structure 102, reduces the moisture in received inlet air 101, and supplies dehumidified air 106 back to structure 102. Evaporator system 104 may distribute dehumidified air 106 throughout structure 102 via air ducts, as illustrated.

In general, dehumidification system 100 is a split system wherein evaporator system 104 is coupled to a remote condenser system 108 that is located external to structure 102. Remote condenser system 108 may include a condenser unit 112 and a compressor unit 114 that facilitate the functions of evaporator system 104 by processing a flow of refrigerant as part of a refrigeration cycle. The flow of refrigerant may include any suitable cooling material, such as R410a refrigerant. In certain embodiments, compressor unit 114 may receive the flow of refrigerant vapor from evaporator system 104 via a refrigerant line 116. Compressor unit 114 may pressurize the flow of refrigerant, thereby increasing the temperature of the refrigerant. The speed of the compressor may be modulated to effectuate desired operating characteristics. Condenser unit 112 may receive the pressurized flow of refrigerant vapor from compressor unit 114 and cool the pressurized refrigerant by facilitating heat transfer from the flow of refrigerant to the ambient air exterior to structure 102. In certain embodiments, remote condenser system 108 may utilize a heat exchanger, such as a microchannel heat exchanger to remove heat from the flow of refrigerant. Remote condenser system 108 may include a fan that draws ambient air from outside structure 102 for use in cooling the flow of refrigerant. In certain embodiments, the speed of this fan is modulated to effectuate desired operating characteristics. An illustrative embodiment of an example condenser system is shown, for example, in FIG. 7 (described in further detail below).

After being cooled and condensed to liquid by condenser unit 112, the flow of refrigerant may travel by a refrigerant line 118 to evaporator system 104. In certain embodiments, the flow of refrigerant may be received by an expansion device (described in further detail below) that reduces the pressure of the flow of refrigerant, thereby reducing the temperature of the flow of refrigerant. An evaporator unit (described in further detail below) of evaporator system 104 may receive the flow of refrigerant from the expansion device and use the flow of refrigerant to dehumidify and cool an incoming airflow. The flow of refrigerant may then flow back to remote condenser system 108 and repeat this cycle.

In certain embodiments, evaporator system 104 may be installed in series with an air mover. An air mover may include a fan that blows air from one location to another. An air mover may facilitate distribution of outgoing air from evaporator system 104 to various parts of structure 102. An air mover and evaporator system 104 may have separate return inlets from which air is drawn. In certain embodiments, outgoing air from evaporator system 104 may be mixed with air produced by another component (e.g., an air conditioner) and blown through air ducts by the air mover. In other embodiments, evaporator system 104 may perform both cooling and dehumidifying and thus may be used without a conventional air conditioner.

Although a particular implementation of dehumidification system 100 is illustrated and primarily described, the present disclosure contemplates any suitable implementation of dehumidification system 100, according to particular needs. Moreover, although various components of dehumidification system 100 have been depicted as being located at particular positions, the present disclosure contemplates those components being positioned at any suitable location, according to particular needs.

Figure 2:
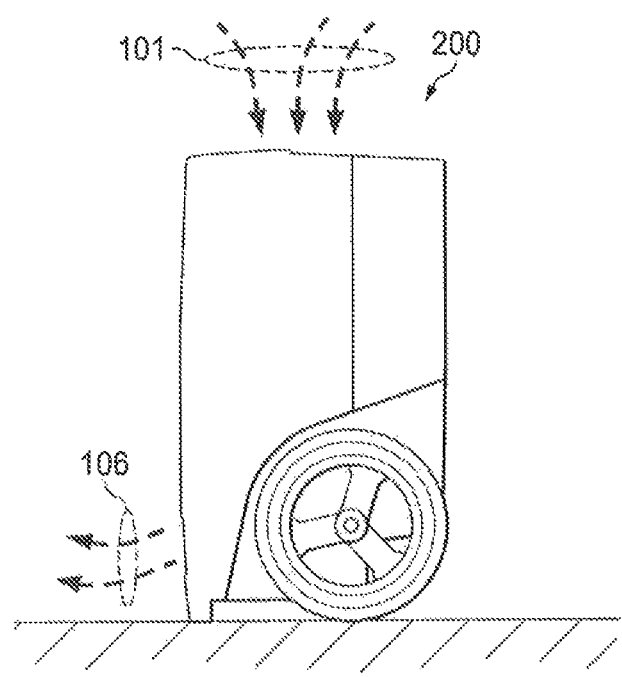
FIG. 2 illustrates an example portable system for reducing the humidity of air within a structure, according to certain embodiments.

FIG. 2 illustrates an example portable dehumidification system 200 for reducing the humidity of air within structure 102, according to certain embodiments of the present disclosure. Dehumidification system 200 may be positioned anywhere within structure 102 in order to direct dehumidified air 106 towards areas that require dehumidification (e.g., water-damaged areas). In general, dehumidification system 200 receives inlet airflow 101, removes water from the inlet airflow 101, and discharges dehumidified air 106 air back into structure 102. In certain embodiments, structure 102 includes a space that has suffered water damage (e.g., as a result of a flood or fire). In order to restore the water-damaged structure 102, one or more dehumidification systems 200 may be strategically positioned within structure 102 in order to quickly reduce the humidity of the air within the structure 102 and thereby dry the portions of structure 102 that suffered water damage.

Although a particular implementation of portable dehumidification system 200 is illustrated and primarily described, the present disclosure contemplates any suitable implementation of portable dehumidification system 200, according to particular needs. Moreover, although various components of portable dehumidification system 200 have been depicted as being located at particular positions within structure 102, the present disclosure contemplates those components being positioned at any suitable location, according to particular needs.

Figure 3:
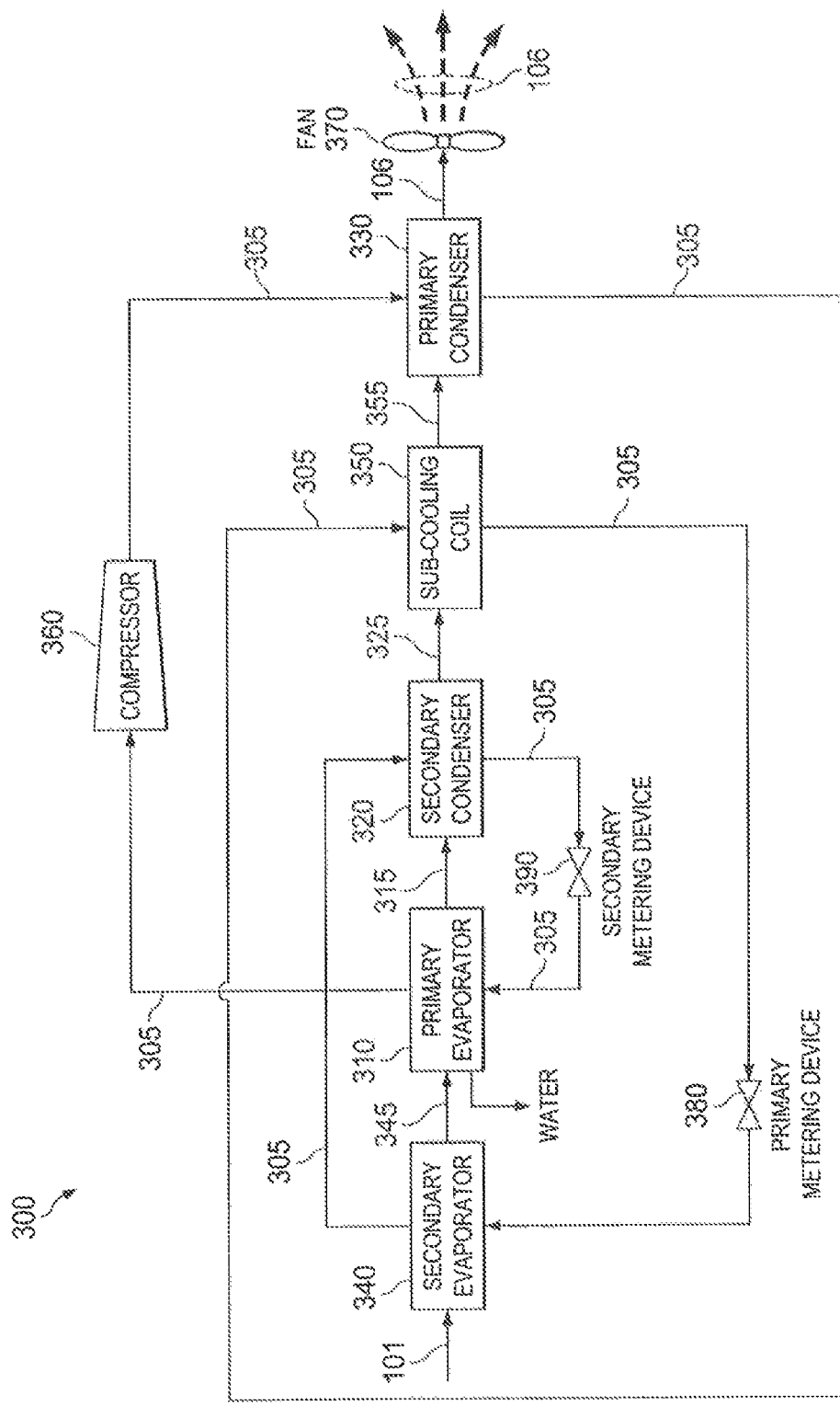
FIGS. 3 and 4 illustrate an example dehumidification system that may be used by the systems of FIGS. 1 and 2 to reduce the humidity of air within a structure, according to certain embodiments.
Figure 4:
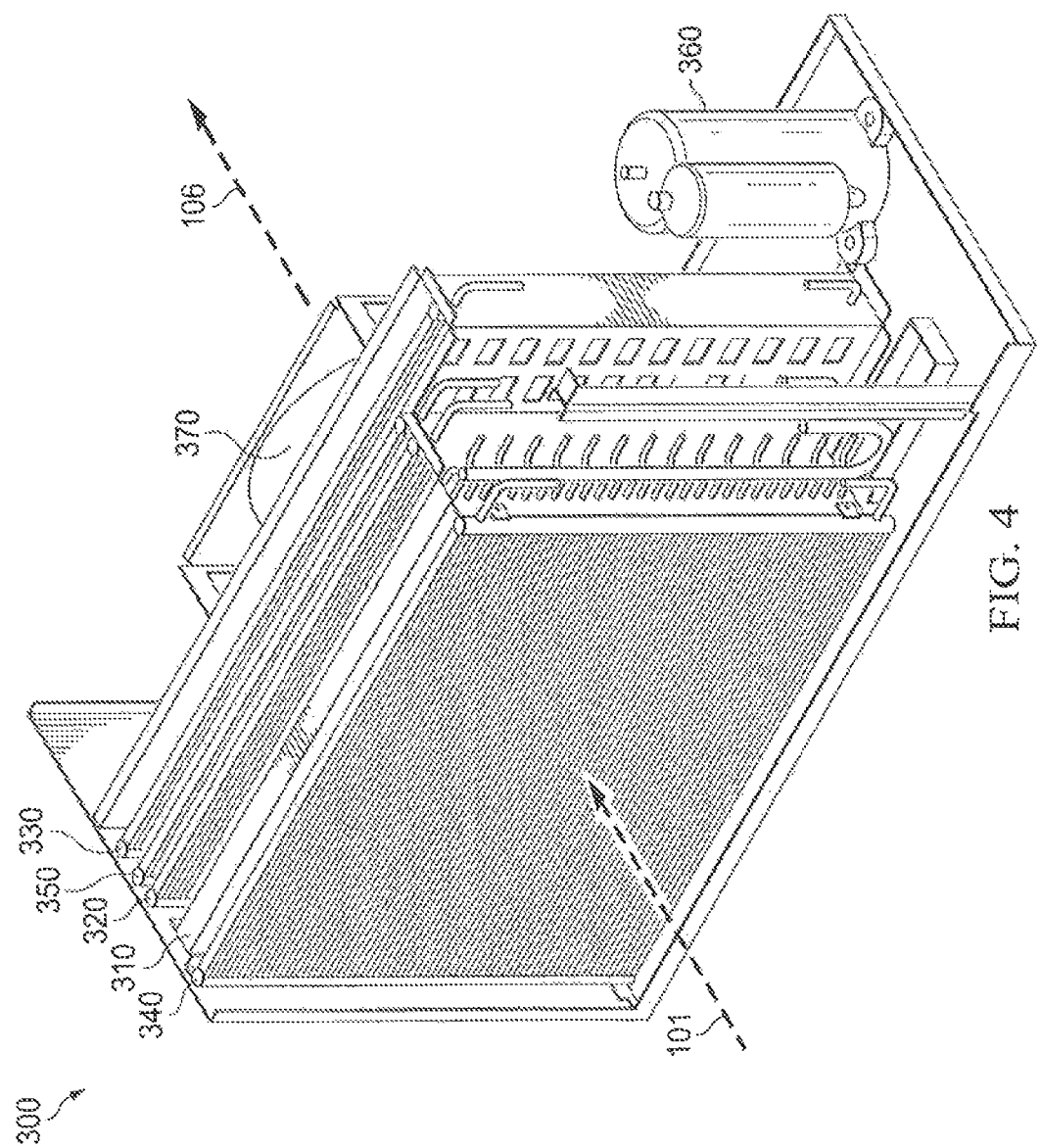

FIGS. 3 and 4 illustrate an example dehumidification system 300 that may be used by dehumidification system 100 and portable dehumidification system 200 of FIGS. 1 and 2 to reduce the humidity of air within structure 102.

Dehumidification system 300 includes a primary evaporator 310, a primary condenser 330, a secondary evaporator 340, a secondary condenser 320, a compressor 360, a primary metering device 380, a secondary metering device 390, and a fan 370. In some embodiments, dehumidification system 300 may additionally include a sub-cooling coil 350. In certain embodiments, sub-cooling coil 350 and primary condenser 330 are combined into a single coil. A flow of refrigerant 305 is circulated through dehumidification system 300 as illustrated. In general, dehumidification system 300 receives inlet airflow 101, removes water from inlet airflow 101, and discharges dehumidified air 106. Water is removed from inlet air 101 using a refrigeration cycle of flow of refrigerant 305. By including secondary evaporator 340 and secondary condenser 320, however, dehumidification system 300 causes at least part of the flow of refrigerant 305 to evaporate and condense twice in a single refrigeration cycle. This increases the refrigeration capacity over typical systems without adding any additional power to the compressor, thereby increasing the overall dehumidification efficiency of the system.

In general, dehumidification system 300 attempts to match the saturating temperature of secondary evaporator 340 to the saturating temperature of secondary condenser 320. The saturating temperature of secondary evaporator 340 and secondary condenser 320 generally is controlled according to the equation: (temperature of inlet air 101+ temperature of second airflow 315)/2. As the saturating temperature of secondary evaporator 340 is lower than inlet air 101, evaporation happens in secondary evaporator 340. As the saturating temperature of secondary condenser 320 is higher than second airflow 315, condensation happens in the secondary condenser 320. The amount of refrigerant 305 evaporating in secondary evaporator 340 is substantially equal to that condensing in secondary condenser 320.

Primary evaporator 310 receives flow of refrigerant 305 from secondary metering device 390 and outputs flow of refrigerant 305 to compressor 360. Primary evaporator 310 may be any type of coil (e.g., fin tube, micro channel, etc.). Primary evaporator 310 receives first airflow 345 from secondary evaporator 340 and outputs second airflow 315 to secondary condenser 320. Second airflow 315, in general, is at a cooler temperature than first airflow 345. To cool incoming first airflow 345, primary evaporator 310 transfers heat from first airflow 345 to flow of refrigerant 305, thereby causing flow of refrigerant 305 to evaporate at least partially from liquid to gas. This transfer of heat from first airflow 345 to flow of refrigerant 305 also removes water from first airflow 345.

Secondary condenser 320 receives flow of refrigerant 305 from secondary evaporator 340 and outputs flow of refrigerant 305 to secondary metering device 390. Secondary condenser 320 may be any type of coil (e.g., fin tube, micro channel, etc.). Secondary condenser 320 receives second airflow 315 from primary evaporator 310 and outputs third airflow 325. Third airflow 325 is, in general, warmer and drier (i.e., the dew point will be the same but relative humidity will be lower) than second airflow 315. Secondary condenser 320 generates third airflow 325 by transferring heat from flow of refrigerant 305 to second airflow 315, thereby causing flow of refrigerant 305 to condense at least partially from gas to liquid.

Primary condenser 330 receives flow of refrigerant 305 from compressor 360 and outputs flow of refrigerant 305 to either primary metering device 380 or sub-cooling coil 350. Primary condenser 330 may be any type of coil (e.g., fin tube, micro channel, etc.). Primary condenser 330 receives either third airflow 325 or fourth airflow 355 and outputs dehumidified air 106. Dehumidified air 106 is, in general, warmer and drier (i.e., have a lower relative humidity) than third airflow 325 and fourth airflow 355. Primary condenser 330 generates dehumidified air 106 by transferring heat from flow of refrigerant 305, thereby causing flow of refrigerant 305 to condense at least partially from gas to liquid. In some embodiments, primary condenser 330 completely condenses flow of refrigerant 305 to a liquid (i.e., 100% liquid). In other embodiments, primary condenser 330 partially condenses flow of refrigerant 305 to a liquid (i.e., less than 100% liquid). In certain embodiments, as shown in FIG. 4, a portion of primary condenser 330 receives a separate airflow in addition to airflow 101. For example, the right-most edge of primary condenser 330 of FIG. 4 extends beyond, or overhangs, the right-most edges of secondary evaporator 340, primary evaporator 310, secondary condenser 320, and sub-cooling coil 350. This overhanging portion of primary condenser 330 may receive an additional separate airflow.

Secondary evaporator 340 receives flow of refrigerant 305 from primary metering device 380 and outputs flow of refrigerant 305 to secondary condenser 320. Secondary evaporator 340 may be any type of coil (e.g., fin tube, micro channel, etc.). Secondary evaporator 340 receives inlet air 101 and outputs first airflow 345 to primary evaporator 310. First airflow 345, in general, is at a cooler temperature than inlet air 101. To cool incoming inlet air 101, secondary evaporator 340 transfers heat from inlet air 101 to flow of refrigerant 305, thereby causing flow of refrigerant 305 to evaporate at least partially from liquid to gas.

Sub-cooling coil 350, which is an optional component of dehumidification system 300, sub-cools the liquid refrigerant 305 as it leaves primary condenser 330. This, in turn, supplies primary metering device 380 with a liquid refrigerant that is up to 30 degrees (or more) cooler than before it enters sub-cooling coil 350. For example, if flow of refrigerant 305 entering sub-cooling coil 350 is 340 psig/105° F./60% vapor, flow of refrigerant 305 may be 340 psig/80° F./0% vapor as it leaves sub-cooling coil 350. The sub-cooled refrigerant 305 has a greater heat enthalpy factor as well as a greater density, which results in reduced cycle times and frequency of the evaporation cycle of flow of refrigerant 305. This results in greater efficiency and less energy use of dehumidification system 300. Embodiments of dehumidification system 300 may or may not include a sub-cooling coil 350. For example, embodiments of dehumidification system 300 utilized within portable dehumidification system 200 that have a microchannel condenser 330 or 320 may include a sub-cooling coil 350, while embodiments of dehumidification system 300 that utilize another type of condenser 330 or 320 may not include a sub-cooling coil 350. As another example, dehumidification system 300 utilized within a split system such as dehumidification system 100 may not include a sub-cooling coil 350.

Compressor 360 pressurizes flow of refrigerant 305, thereby increasing the temperature of refrigerant 305. For example, if flow of refrigerant 305 entering compressor 360 is 128 psig/52° F./100% vapor, flow of refrigerant 305 may be 340 psig/150° F./100% vapor as it leaves compressor 360. Compressor 360 receives flow of refrigerant 305 from primary evaporator 310 and supplies the pressurized flow of refrigerant 305 to primary condenser 330.

Fan 370 may include any suitable components operable to draw inlet air 101 into dehumidification system 300 and through secondary evaporator 340, primary evaporator 310, secondary condenser 320, sub-cooling coil 350, and primary condenser 330. Fan 370 may be any type of air mover (e.g., axial fan, forward inclined impeller, and backward inclined impeller, etc.). For example, fan 370 may be a backward inclined impeller positioned adjacent to primary condenser 330 as illustrated in FIG. 3. While fan 370 is depicted in FIG. 3 as being located adjacent to primary condenser 330, it should be understood that fan 370 may be located anywhere along the airflow path of dehumidification system 300. For example, fan 370 may be positioned in the airflow path of any one of airflows 101, 345, 315, 325, 355, or 106. Moreover, dehumidification system 300 may include one or more additional fans positioned within any one or more of these airflow paths.

Primary metering device 380 and secondary metering device 390 are any appropriate type of metering/expansion device. In some embodiments, primary metering device 380 is a thermostatic expansion valve (TXV) and secondary metering device 390 is a fixed orifice device (or vice versa). In certain embodiments, metering devices 380 and 390 remove pressure from flow of refrigerant 305 to allow expansion or change of state from a liquid to a vapor in evaporators 310 and 340. The high-pressure liquid (or mostly liquid) refrigerant entering metering devices 380 and 390 is at a higher temperature than the liquid refrigerant 305 leaving metering devices 380 and 390. For example, if flow of refrigerant 305 entering primary metering device 380 is 340 psig/80° F./0% vapor, flow of refrigerant 305 may be 196 psig/68° F./5% vapor as it leaves primary metering device 380. As another example, if flow of refrigerant 305 entering secondary metering device 390 is 196 psig/68° F./4% vapor, flow of refrigerant 305 may be 128 psig/44° F./14% vapor as it leaves secondary metering device 390.

Refrigerant 305 may be any suitable refrigerant such as R410a. In general, dehumidification system 300 utilizes a closed refrigeration loop of refrigerant 305 that passes from compressor 360 through primary condenser 330, (optionally) sub-cooling coil 350, primary metering device 380, secondary evaporator 340, secondary condenser 320, secondary metering device 390, and primary evaporator 310. Compressor 360 pressurizes flow of refrigerant 305, thereby increasing the temperature of refrigerant 305. Primary and secondary condensers 330 and 320, which may include any suitable heat exchangers, cool the pressurized flow of refrigerant 305 by facilitating heat transfer from the flow of refrigerant 305 to the respective airflows passing through them (i.e., fourth airflow 355 and second airflow 315). The cooled flow of refrigerant 305 leaving primary and secondary condensers 330 and 320 may enter a respective expansion device (i.e., primary metering device 380 and secondary metering device 390) that is operable to reduce the pressure of flow of refrigerant 305, thereby reducing the temperature of flow of refrigerant 305. Primary and secondary evaporators 310 and 340, which may include any suitable heat exchanger, receive flow of refrigerant 305 from secondary metering device 390 and primary metering device 380, respectively. Primary and secondary evaporators 310 and 340 facilitate the transfer of heat from the respective airflows passing through them (i.e., inlet air 101 and first airflow 345) to flow of refrigerant 305. Flow of refrigerant 305, after leaving primary evaporator 310, passes back to compressor 360, and the cycle is repeated.

In certain embodiments, the above-described refrigeration loop may be configured such that evaporators 310 and 340 operate in a flooded state. In other words, flow of refrigerant 305 may enter evaporators 310 and 340 in a liquid state, and a portion of flow of refrigerant 305 may still be in a liquid state as it exits evaporators 310 and 340. Accordingly, the phase change of flow of refrigerant 305 (liquid to vapor as heat is transferred to flow of refrigerant 305) occurs across evaporators 310 and 340, resulting in nearly constant pressure and temperature across the entire evaporators 310 and 340 (and, as a result, increased cooling capacity).

In operation of example embodiments of dehumidification system 300, inlet air 101 may be drawn into dehumidification system 300 by fan 370. Inlet air 101 passes though secondary evaporator 340 in which heat is transferred from inlet air 101 to the cool flow of refrigerant 305 passing through secondary evaporator 340. As a result, inlet air 101 may be cooled. As an example, if inlet air 101 is 80° F./60% humidity, secondary evaporator 340 may output first airflow 345 at 70° F./84% humidity. This may cause flow of refrigerant 305 to partially vaporize within secondary evaporator 340. For example, if flow of refrigerant 305 entering secondary evaporator 340 is 196 psig/68° F./5% vapor, flow of refrigerant 305 may be 196 psig/68° F./38% vapor as it leaves secondary evaporator 340.

The cooled inlet air 101 leaves secondary evaporator 340 as first airflow 345 and enters primary evaporator 310. Like secondary evaporator 340, primary evaporator 310 transfers heat from first airflow 345 to the cool flow of refrigerant 305 passing through primary evaporator 310. As a result, first airflow 345 may be cooled to or below its dew point temperature, causing moisture in first airflow 345 to condense (thereby reducing the absolute humidity of first airflow 345). As an example, if first airflow 345 is 70° F./84% humidity, primary evaporator 310 may output second airflow 315 at 54° F./98% humidity. This may cause flow of refrigerant 305 to partially or completely vaporize within primary evaporator 310. For example, if flow of refrigerant 305 entering primary evaporator 310 is 128 psig/44° F./14% vapor, flow of refrigerant 305 may be 128 psig/52° F./100% vapor as it leaves primary evaporator 310. In certain embodiments, the liquid condensate from first airflow 345 may be collected in a drain pan connected to a condensate reservoir, as illustrated in FIG. 4. Additionally, the condensate reservoir may include a condensate pump that moves collected condensate, either continually or at periodic intervals, out of dehumidification system 300 (e.g., via a drain hose) to a suitable drainage or storage location.

The cooled first airflow 345 leaves primary evaporator 310 as second airflow 315 and enters secondary condenser 320. Secondary condenser 320 facilitates heat transfer from the hot flow of refrigerant 305 passing through the secondary condenser 320 to second airflow 315. This reheats second airflow 315, thereby decreasing the relative humidity of second airflow 315. As an example, if second airflow 315 is 54° F./98% humidity, secondary condenser 320 may output third airflow 325 at 65° F./68% humidity. This may cause flow of refrigerant 305 to partially or completely condense within secondary condenser 320. For example, if flow of refrigerant 305 entering secondary condenser 320 is 196 psig/68° F./38% vapor, flow of refrigerant 305 may be 196 psig/68° F./4% vapor as it leaves secondary condenser 320.

In some embodiments, the dehumidified second airflow 315 leaves secondary condenser 320 as third airflow 325 and enters primary condenser 330. Primary condenser 330 facilitates heat transfer from the hot flow of refrigerant 305 passing through the primary condenser 330 to third airflow 325. This further heats third airflow 325, thereby further decreasing the relative humidity of third airflow 325. As an example, if third airflow 325 is 65° F./68% humidity, secondary condenser 320 may output dehumidified air 106 at 102° F./19% humidity. This may cause flow of refrigerant 305 to partially or completely condense within primary condenser 330. For example, if flow of refrigerant 305 entering primary condenser 330 is 340 psig/150° F./100% vapor, flow of refrigerant 305 may be 340 psig/105° F./60% vapor as it leaves primary condenser 330.

As described above, some embodiments of dehumidification system 300 may include a sub-cooling coil 350 in the airflow between secondary condenser 320 and primary condenser 330. Sub-cooling coil 350 facilitates heat transfer from the hot flow of refrigerant 305 passing through sub-cooling coil 350 to third airflow 325. This further heats third airflow 325, thereby further decreasing the relative humidity of third airflow 325. As an example, if third airflow 325 is 65° F./68% humidity, sub-cooling coil 350 may output fourth airflow 355 at 81° F./37% humidity. This may cause flow of refrigerant 305 to partially or completely condense within sub-cooling coil 350. For example, if flow of refrigerant 305 entering sub-cooling coil 350 is 340 psig/150° F./60% vapor, flow of refrigerant 305 may be 340 psig/80° F./0% vapor as it leaves sub-cooling coil 350.

Some embodiments of dehumidification system 300 may include a controller that may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, the controller may include any suitable combination of software, firmware, and hardware.

The controller may additionally include one or more processing modules. Each processing module may each include one or more microprocessors, controllers, or any other suitable computing devices or resources and may work, either alone or with other components of dehumidification system 300, to provide a portion or all of the functionality described herein. The controller may additionally include (or be communicatively coupled to via wireless or wireline communication) computer memory. The memory may include any memory or database module and may take the form of volatile or non-volatile memory, including, without limitation, magnetic media, optical media, random access memory (RAM), read-only memory (ROM), removable media, or any other suitable local or remote memory component.

Although particular implementations of dehumidification system 300 are illustrated and primarily described, the present disclosure contemplates any suitable implementation of dehumidification system 300, according to particular needs. Moreover, although various components of dehumidification system 300 have been depicted as being located at particular positions and relative to one another, the present disclosure contemplates those components being positioned at any suitable location, according to particular needs.

Figure 5:
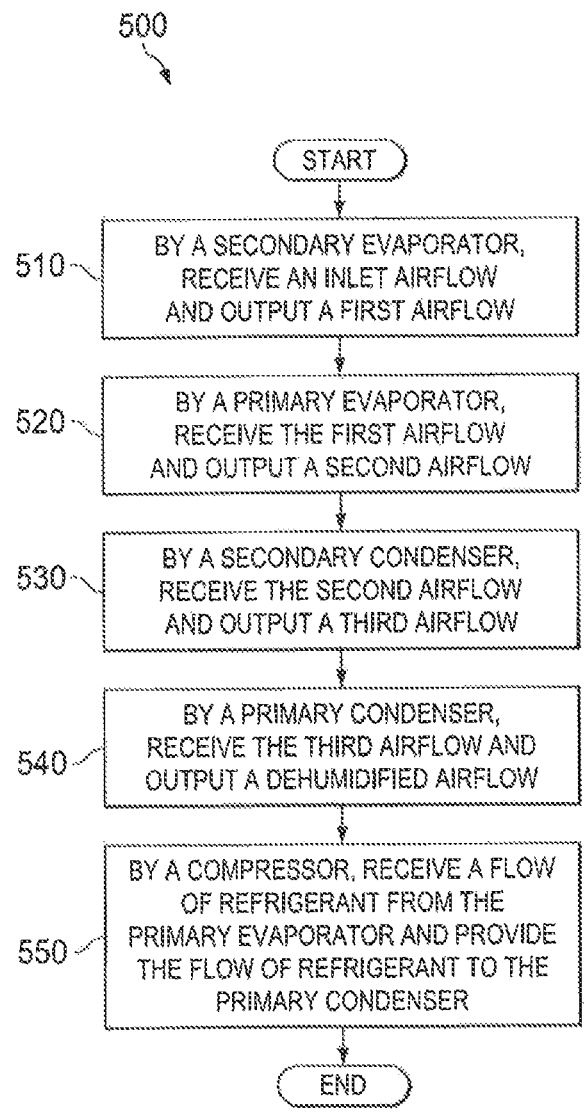
FIG. 5 illustrates an example dehumidification method that may be used by the systems of FIGS. 1 and 2 to reduce the humidity of air within a structure, according to certain embodiments.

FIG. 5 illustrates an example dehumidification method 500 that may be used by dehumidification system 100 and portable dehumidification system 200 of FIGS. 1 and 2 to reduce the humidity of air within structure 102. Method 500 may begin in step 510 where a secondary evaporator receives an inlet airflow and outputs a first airflow. In some embodiments, the secondary evaporator is secondary evaporator 340. In some embodiments, the inlet airflow is inlet air 101 and the first airflow is first airflow 345. In some embodiments, the secondary evaporator of step 510 receives a flow of refrigerant from a primary metering device such as primary metering device 380 and supplies the flow of refrigerant (in a changed state) to a secondary condenser such as secondary condenser 320. In some embodiments, the flow of refrigerant of method 500 is flow of refrigerant 305 described above.

At step 520, a primary evaporator receives the first airflow of step 510 and outputs a second airflow. In some embodiments, the primary evaporator is primary evaporator 310 and the second airflow is second airflow 315. In some embodiments, the primary evaporator of step 520 receives the flow of refrigerant from a secondary metering device such as secondary metering device 390 and supplies the flow of refrigerant (in a changed state) to a compressor such as compressor 360.

At step 530, a secondary condenser receives the second airflow of step 520 and outputs a third airflow. In some embodiments, the secondary condenser is secondary condenser 320 and the third airflow is third airflow 325. In some embodiments, the secondary condenser of step 530 receives a flow of refrigerant from the secondary evaporator of step 510 and supplies the flow of refrigerant (in a changed state) to a secondary metering device such as secondary metering device 390.

At step 540, a primary condenser receives the third airflow of step 530 and outputs a dehumidified airflow. In some embodiments, the primary condenser is primary condenser 330 and the dehumidified airflow is dehumidified air 106. In some embodiments, the primary condenser of step 540 receives a flow of refrigerant from the compressor of step 520 and supplies the flow of refrigerant (in a changed state) to the primary metering device of step 510. In alternate embodiments, the primary condenser of step 540 supplies the flow of refrigerant (in a changed state) to a sub-cooling coil such as sub-cooling coil 350 which in turn supplies the flow of refrigerant (in a changed state) to the primary metering device of step 510.

At step 550, a compressor receives the flow of refrigerant from the primary evaporator of step 520 and provides the flow of refrigerant (in a changed state) to the primary condenser of step 540. After step 550, method 500 may end.

Particular embodiments may repeat one or more steps of method 500 of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example dehumidification method for reducing the humidity of air within a structure including the particular steps of the method of FIG. 5, this disclosure contemplates any suitable method for reducing the humidity of air within a structure including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

While the example method of FIG. 5 is described at times above with respect to dehumidification system 300 of FIG. 3, it should be understood that the same or similar methods can be carried out using any of the dehumidification systems described herein, including dehumidification systems 600 and 800 of FIGS. 6A-6B and 8 (described below). Moreover, it should be understood that, with respect to the example method of FIG. 5, reference to an evaporator or condenser can refer to an evaporator portion or condenser portion of a single coil pack operable to perform the functions of these components, for example, as described above with respect to examples of FIGS. 9 and 10.

Figure 6A:
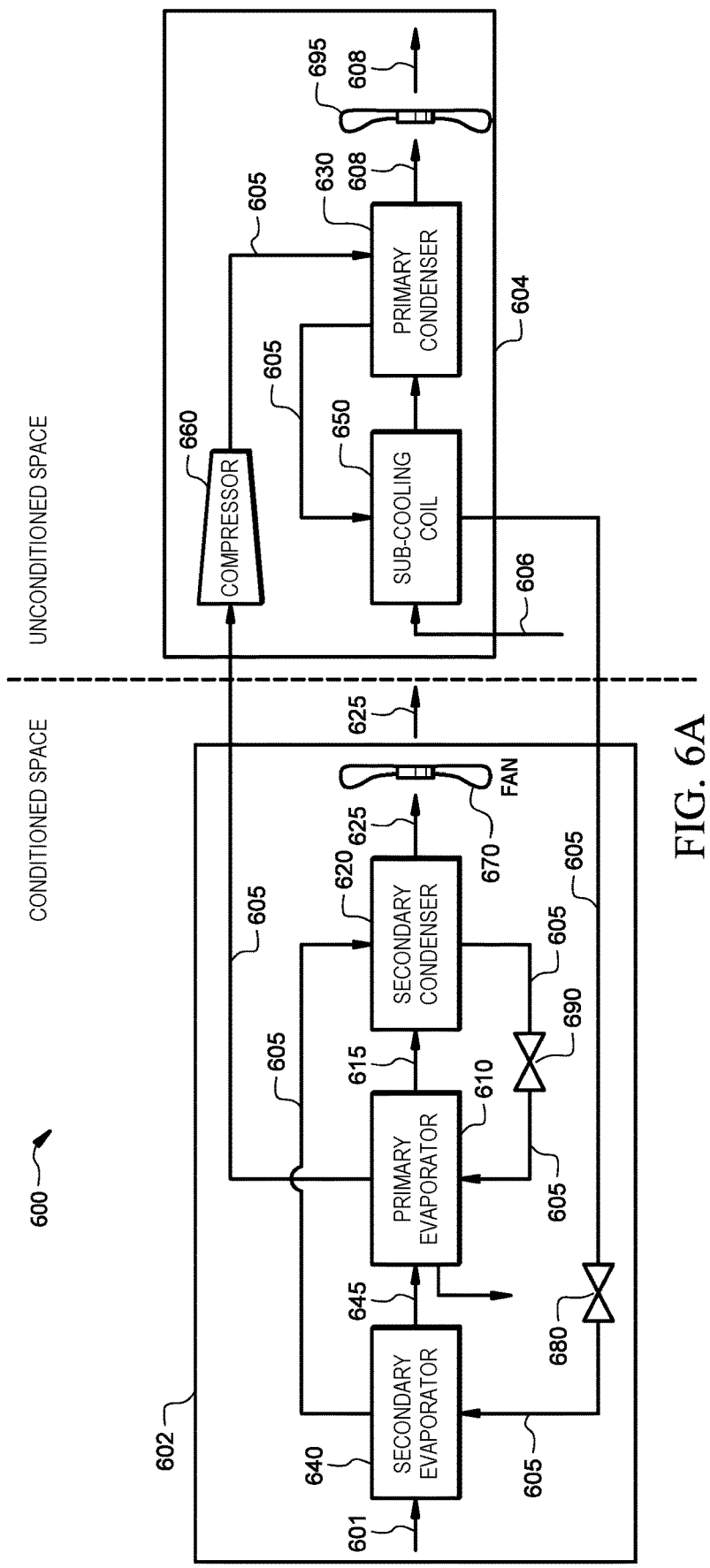
FIGS. 6A and 6B illustrate an example air conditioning and dehumidification system, according to certain embodiments.
Figure 6B:
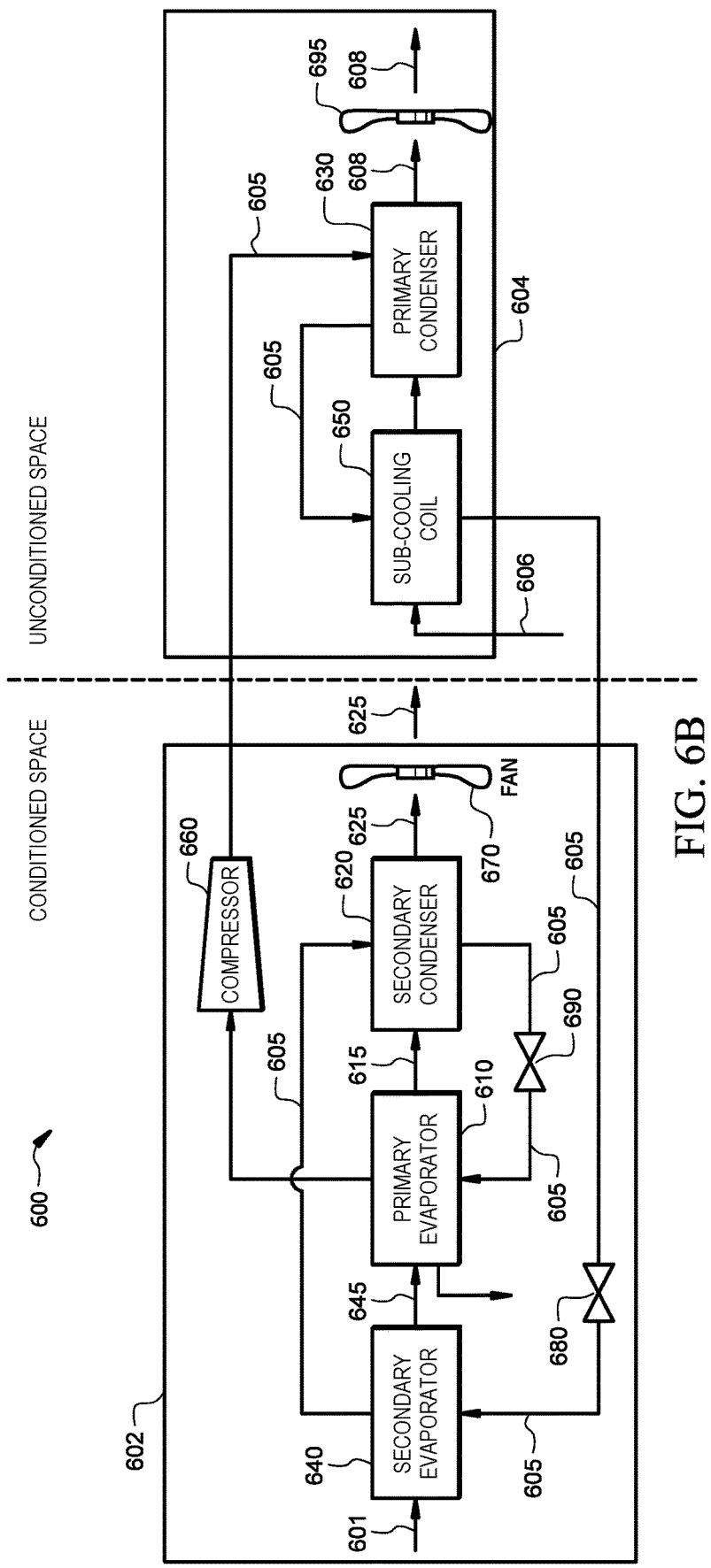

FIGS. 6A and 6B illustrate an example air conditioning and dehumidification system 600 that may be used in accordance with split dehumidification system 100 of FIG. 1 to reduce the humidity of air within structure 102. Dehumidification system 600 includes a dehumidification unit 602, which is generally indoors, and a condenser system 604 (e.g., condenser system 108 of FIG. 1). As illustrated in FIG. 6A, dehumidification unit 602 includes a primary evaporator 610, a secondary evaporator 640, a secondary condenser 620, a primary metering device 680, a secondary metering device 690, and a first fan 670, while condenser system 604 includes a primary condenser 630, a compressor 660, an optional sub-cooling coil 650 and a second fan 695. In the embodiment illustrated in FIG. 6B, the compressor 660 may be disposed within the dehumidification unit 602 rather than disposed within the condenser system 604.

With reference to both FIGS. 6A and 6B, a flow of refrigerant 605 is circulated through dehumidification system 600 as illustrated. In general, dehumidification unit 602 receives inlet airflow 601, removes water from inlet airflow 601, and discharges dehumidified air 625 into a conditioned space. Water is removed from inlet air 601 using a refrigeration cycle of flow of refrigerant 605. The flow of refrigerant 605 through system 600 of FIGS. 6A AND 6B proceeds in a similar manner to that of the flow of refrigerant 305 through dehumidification system 300 of FIG. 3. However, the path of airflow through system 600 is different than that through system 300, as described herein. By including secondary evaporator 640 and secondary condenser 620, however, dehumidification system 600 causes at least part of the flow of refrigerant 605 to evaporate and condense twice in a single refrigeration cycle. This increases refrigerating capacity over typical systems without requiring any additional power to the compressor, thereby increasing the overall efficiency of the system.

The split configuration of system 600, which includes dehumidification unit 602 and condenser system 604, allows heat from the cooling and dehumidification process to be rejected outdoors or to an unconditioned space (e.g., external to a space being dehumidified). This allows dehumidification system 600 to have a similar footprint to that of typical central air conditioning systems or heat pumps. In general, the temperature of third airflow 625 output to the conditioned space from system 600 is significantly decreased compared to that of airflow 106 output from system 300 of FIG. 3. Thus, the configuration of system 600 allows dehumidified air to be provided to the conditioned space at a decreased temperature. Accordingly, system 600 may perform functions of both a dehumidifier (dehumidifying air) and a central air conditioner (cooling air).

In general, dehumidification system 600 attempts to match the saturating temperature of secondary evaporator 640 to the saturating temperature of secondary condenser 620. The saturating temperature of secondary evaporator 640 and secondary condenser 620 generally is controlled according to the equation: (temperature of inlet air 601+ temperature of second airflow 615)/2. As the saturating temperature of secondary evaporator 640 is lower than inlet air 601, evaporation happens in secondary evaporator 640. As the saturating temperature of secondary condenser 620 is higher than second airflow 615, condensation happens in secondary condenser 620. The amount of refrigerant 605 evaporating in secondary evaporator 640 is substantially equal to that condensing in secondary condenser 620.

Primary evaporator 610 receives flow of refrigerant 605 from secondary metering device 690 and outputs flow of refrigerant 605 to compressor 660. Primary evaporator 610 may be any type of coil (e.g., fin tube, micro channel, etc.). Primary evaporator 610 receives first airflow 645 from secondary evaporator 640 and outputs second airflow 615 to secondary condenser 620. Second airflow 615, in general, is at a cooler temperature than first airflow 645. To cool incoming first airflow 645, primary evaporator 610 transfers heat from first airflow 645 to flow of refrigerant 605, thereby causing flow of refrigerant 605 to evaporate at least partially from liquid to gas. This transfer of heat from first airflow 645 to flow of refrigerant 605 also removes water from first airflow 645.

Figure 8A:
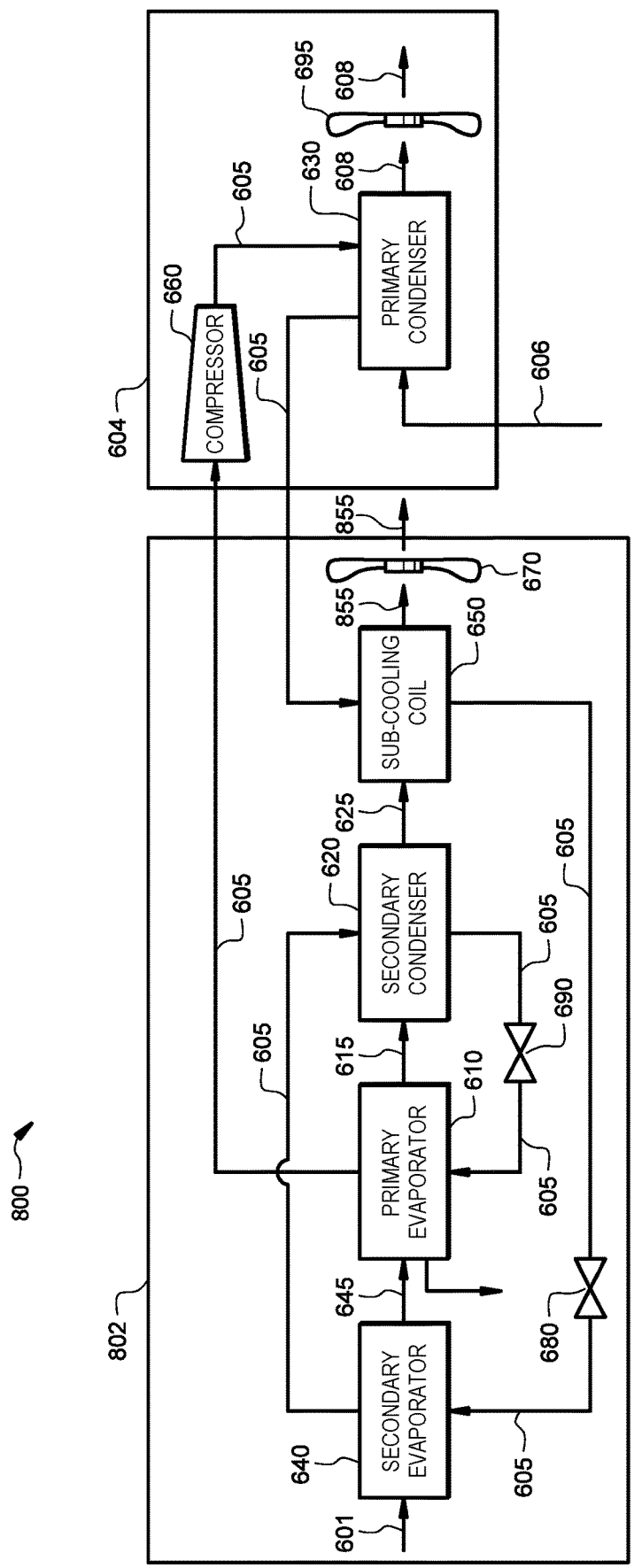
FIGS. 8A, 8B, and 8C illustrate an example air conditioning and dehumidification system, according to certain embodiments.
Figure 8B:
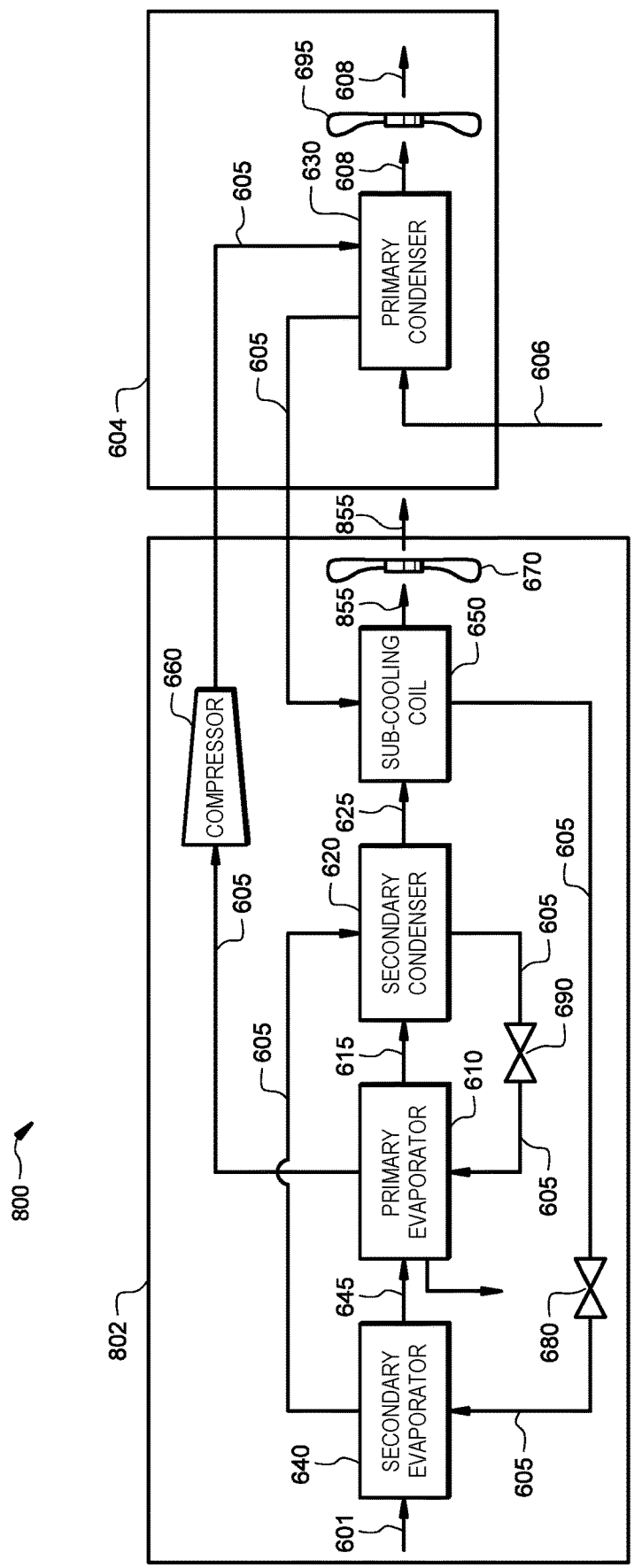

Secondary condenser 620 receives flow of refrigerant 605 from secondary evaporator 640 and outputs flow of refrigerant 605 to secondary metering device 690. Secondary condenser 620 may be any type of coil (e.g., fin tube, micro channel, etc.). Secondary condenser 620 receives second airflow 615 from primary evaporator 610 and outputs third airflow 625. Third airflow 625 is, in general, warmer and drier (i.e., the dew point will be the same but relative humidity will be lower) than second airflow 615. Secondary condenser 620 generates third airflow 625 by transferring heat from flow of refrigerant 605 to second airflow 615, thereby causing flow of refrigerant 605 to condense at least partially from gas to liquid. As described above, third airflow 625 is output into the conditioned space. In other embodiments (e.g., as shown in FIGS. 8A and 8B), third airflow 625 may first pass through and/or over sub-cooling coil 650 before being output into the conditioned space at a further decreased relative humidity.

As shown in FIG. 6A, refrigerant 605 flows outdoors or to an unconditioned space to compressor 660 of condenser system 604. Alternatively, the refrigerant 605 may continue to flow to the compressor 660 within the dehumidification unit 602 prior to flowing outdoors or to an unconditioned space, as seen in FIG. 6B. In both FIGS. 6A and 6B, compressor 660 pressurizes flow of refrigerant 605, thereby increasing the temperature of refrigerant 605. For example, if flow of refrigerant 605 entering compressor 660 is 128 psig/52° F./100% vapor, flow of refrigerant 605 may be 340 psig/150° F./100% vapor as it leaves compressor 660. Compressor 660 receives flow of refrigerant 605 from primary evaporator 610 and supplies the pressurized flow of refrigerant 605 to primary condenser 630.

Primary condenser 630 receives flow of refrigerant 605 from compressor 660 and outputs flow of refrigerant 605 to sub-cooling coil 650. Primary condenser 630 may be any type of coil (e.g., fin tube, micro channel, etc.). Primary condenser 630 and sub-cooling coil 650 receive first outdoor airflow 606 and output second outdoor airflow 608. Second outdoor airflow 608 is, in general, warmer (i.e., have a lower relative humidity) than first outdoor airflow 606. Primary condenser 630 transfers heat from flow of refrigerant 605, thereby causing flow of refrigerant 605 to condense at least partially from gas to liquid. In some embodiments, primary condenser 630 completely condenses flow of refrigerant 605 to a liquid (i.e., 100% liquid). In other embodiments, primary condenser 630 partially condenses flow of refrigerant 605 to a liquid (i.e., less than 100% liquid).

Sub-cooling coil 650, which is an optional component of dehumidification system 600, sub-cools the liquid refrigerant 605 as it leaves primary condenser 630. This, in turn, supplies primary metering device 680 with a liquid refrigerant that is 30 degrees (or more) cooler than before it enters sub-cooling coil 650. For example, if flow of refrigerant 605 entering sub-cooling coil 650 is 340 psig/105° F./60% vapor, flow of refrigerant 605 may be 340 psig/80° F./0% vapor as it leaves sub-cooling coil 650. The sub-cooled refrigerant 605 has a greater heat enthalpy factor as well as a greater density, which improves energy transfer between airflow and evaporator resulting in the removal of further latent heat from refrigerant 605. This further results in greater efficiency and less energy use of dehumidification system 600. Embodiments of dehumidification system 600 may or may not include a sub-cooling coil 650.

Figure 7:
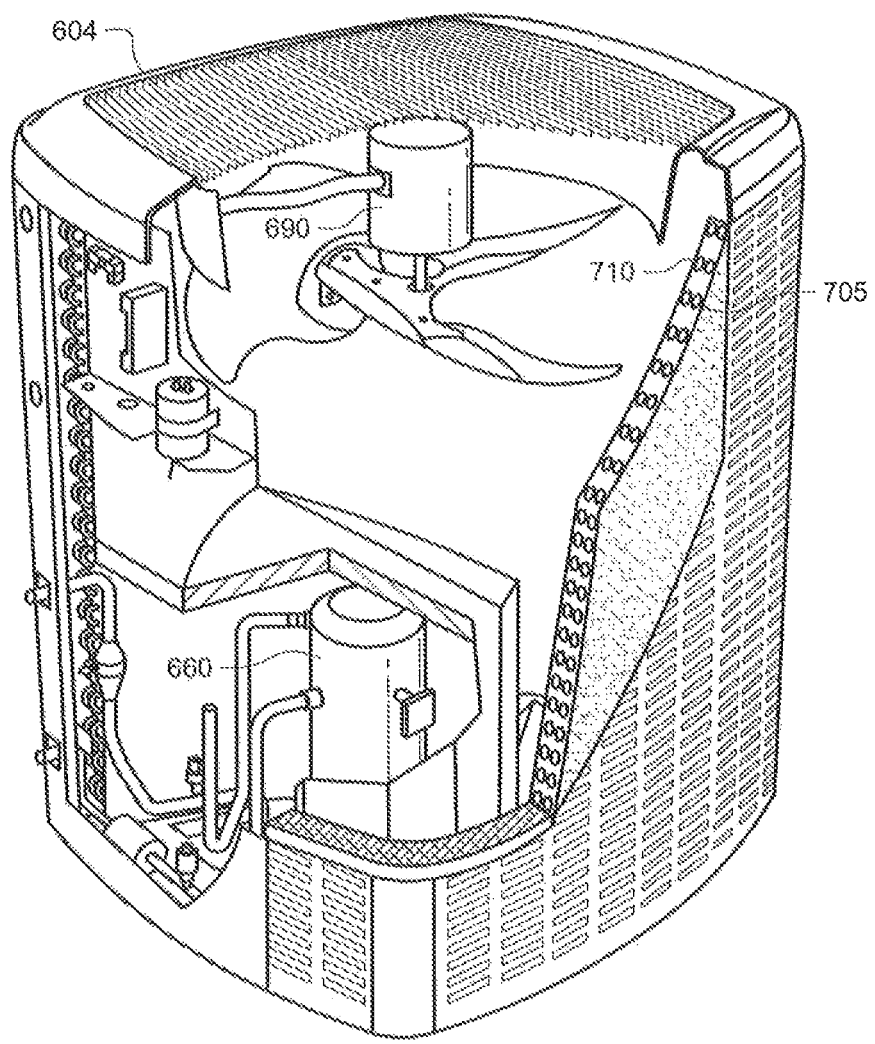
FIG. 7 illustrates an example condenser system for use in the system described herein, according to certain embodiments.

In certain embodiments, sub-cooling coil 650 and primary condenser 630 are combined into a single coil. Such a single coil includes appropriate circuiting for flow of airflows 606 and 608 and refrigerant 605. An illustrative example of a condenser system 604 comprising a single coil condenser and sub-cooling coil is shown in FIG. 7. The single unit coil comprises interior tubes 710 corresponding to the condenser and exterior tubes 705 corresponding to the sub-cooling coil. Refrigerant may be directed through the interior tubes 710 before flowing through exterior tubes 705. In the illustrative example shown in FIG. 7, airflow is drawn through the single unit coil by fan 695 and expelled upwards. It should be understood, however, that condenser systems of other embodiments can include a condenser, compressor, optional sub-cooling coil, and fan with other configurations known in the art.

Secondary evaporator 640 receives flow of refrigerant 605 from primary metering device 680 and outputs flow of refrigerant 605 to secondary condenser 620. Secondary evaporator 640 may be any type of coil (e.g., fin tube, micro channel, etc.). Secondary evaporator 640 receives inlet air 601 and outputs first airflow 645 to primary evaporator 610. First airflow 645, in general, is at a cooler temperature than inlet air 601. To cool incoming inlet air 601, secondary evaporator 640 transfers heat from inlet air 601 to flow of refrigerant 605, thereby causing flow of refrigerant 605 to evaporate at least partially from liquid to gas.

Fan 670 may include any suitable components operable to draw inlet air 601 into dehumidification unit 602 and through secondary evaporator 640, primary evaporator 610, and secondary condenser 620. Fan 670 may be any type of air mover (e.g., axial fan, forward inclined impeller, and backward inclined impeller, etc.). For example, fan 670 may be a backward inclined impeller positioned adjacent to secondary condenser 620.

While fan 670 is depicted in FIGS. 6A and 6B as being located adjacent to condenser 620, it should be understood that fan 670 may be located anywhere along the airflow path of dehumidification unit 602. For example, fan 670 may be positioned in the airflow path of any one of airflows 601, 645, 615, or 625. Moreover, dehumidification unit 602 may include one or more additional fans positioned within any one or more of these airflow paths. Similarly, while fan 695 of condenser system 604 is depicted in FIGS. 6A and 6B as being located above primary condenser 630, it should be understood that fan 695 may be located anywhere (e.g., above, below, beside) with respect to condenser 630 and sub-cooling coil 650, so long fan 695 is appropriately positioned and configured to facilitate flow of airflow 606 towards primary condenser 630 and sub-cooling coil 650.

The rate of airflow generated by fan 670 may be different than that generated by fan 695. For example, the flow rate of airflow 606 generated by fan 695 may be higher than the flow rate of airflow 601 generated by fan 670. This difference in flow rates may provide several advantages for the dehumidification systems described herein. For example, a large airflow generated by fan 695 may provide for improved heat transfer at the sub-cooling coil 650 and primary condenser 630 of the condenser system 604. In general, the rate of airflow generated by second fan 695 is between about 2-times to 5-times that of the rate of airflow generated by first fan 670. For example, the rate of airflow generated by first fan 670 may be from about 200 to 400 cubic feet per minute (cfm). For example, the rate of airflow generated by second fan 695 may be from about 900 to 1200 cubic feet per minute (cfm).

Primary metering device 680 and secondary metering device 690 are any appropriate type of metering/expansion device. In some embodiments, primary metering device 680 is a thermostatic expansion valve (TXV) and secondary metering device 690 is a fixed orifice device (or vice versa). In certain embodiments, metering devices 680 and 690 remove pressure from flow of refrigerant 605 to allow expansion or change of state from a liquid to a vapor in evaporators 610 and 640. The high-pressure liquid (or mostly liquid) refrigerant entering metering devices 680 and 690 is at a higher temperature than the liquid refrigerant 605 leaving metering devices 680 and 690. For example, if flow of refrigerant 605 entering primary metering device 680 is 340 psig/80° F./0% vapor, flow of refrigerant 605 may be 196 psig/68° F./5% vapor as it leaves primary metering device 680. As another example, if flow of refrigerant 605 entering secondary metering device 690 is 196 psig/68° F./4% vapor, flow of refrigerant 605 may be 128 psig/44° F./14% vapor as it leaves secondary metering device 690.

In certain embodiments, secondary metering device 690 is operated in a substantially open state (referred to herein as a "fully open" state) such that the pressure of refrigerant 605 entering metering device 690 is substantially the same as the pressure of refrigerant 605 exiting metering device 605. For example, the pressure of refrigerant 605 may be 80%, 90%, 95%, 99%, or up to 100% of the pressure of refrigerant 605 entering metering device 690. With the secondary metering device 690 operated in a "fully open" state, primary metering device 680 is the primary source of pressure drop in dehumidification system 600. In this configuration, airflow 615 is not substantially heated when it passes through secondary condenser 620, and the secondary evaporator 640, primary evaporator 610, and secondary condenser 620 effectively act as a single evaporator. Although, less water may be removed from airflow 601 when the secondary metering device 690 is operated in a "fully open" state, airflow 606 will be output to the conditioned space at a lower temperature than when secondary metering device 690 is not in a "fully open" state. This configuration corresponds to a relatively high sensible heat ratio (SHR) operating mode such that dehumidification system 600 may produce a cool airflow 625 with properties similar to those of an airflow produced by a central air conditioner. If the rate of airflow 601 is increased to a threshold value (e.g., by increasing the speed of fan 670 or one or more other fans of dehumidification system 600), dehumidification system 600 may perform sensible cooling without removing water from airflow 601.

Refrigerant 605 may be any suitable refrigerant such as R410a. In general, dehumidification system 600 utilizes a closed refrigeration loop of refrigerant 605 that passes from compressor 660 through primary condenser 630, (optionally) sub-cooling coil 650, primary metering device 680, secondary evaporator 640, secondary condenser 620, secondary metering device 690, and primary evaporator 610. Compressor 660 pressurizes flow of refrigerant 605, thereby increasing the temperature of refrigerant 605. Primary and secondary condensers 630 and 620, which may include any suitable heat exchangers, cool the pressurized flow of refrigerant 605 by facilitating heat transfer from the flow of refrigerant 605 to the respective airflows passing through them (i.e., first outdoor airflow 606 and second airflow 615). The cooled flow of refrigerant 605 leaving primary and secondary condensers 630 and 620 may enter a respective expansion device (i.e., primary metering device 680 and secondary metering device 690) that is operable to reduce the pressure of flow of refrigerant 605, thereby reducing the temperature of flow of refrigerant 605. Primary and secondary evaporators 610 and 640, which may include any suitable heat exchanger, receive flow of refrigerant 605 from secondary metering device 690 and primary metering device 680, respectively. Primary and secondary evaporators 610 and 640 facilitate the transfer of heat from the respective airflows passing through them (i.e., inlet air 601 and first airflow 645) to flow of refrigerant 605. Flow of refrigerant 605, after leaving primary evaporator 610, passes back to compressor 660, and the cycle is repeated.

In certain embodiments, the above-described refrigeration loop may be configured such that evaporators 610 and 640 operate in a flooded state. In other words, flow of refrigerant 605 may enter evaporators 610 and 640 in a liquid state, and a portion of flow of refrigerant 605 may still be in a liquid state as it exits evaporators 610 and 640. Accordingly, the phase change of flow of refrigerant 605 (liquid to vapor as heat is transferred to flow of refrigerant 605) occurs across evaporators 610 and 640, resulting in nearly constant pressure and temperature across the entire evaporators 610 and 640 (and, as a result, increased cooling capacity).

In operation of example embodiments of dehumidification system 600, inlet air 601 may be drawn into dehumidification system 600 by fan 670. Inlet air 601 passes though secondary evaporator 640 in which heat is transferred from inlet air 601 to the cool flow of refrigerant 605 passing through secondary evaporator 640. As a result, inlet air 601 may be cooled. As an example, if inlet air 601 is 80° F./60% humidity, secondary evaporator 640 may output first airflow 645 at 70° F./84% humidity. This may cause flow of refrigerant 605 to partially vaporize within secondary evaporator 640. For example, if flow of refrigerant 605 entering secondary evaporator 640 is 196 psig/68° F./5% vapor, flow of refrigerant 605 may be 196 psig/68° F./38% vapor as it leaves secondary evaporator 640.

The cooled inlet air 601 leaves secondary evaporator 640 as first airflow 645 and enters primary evaporator 610. Like secondary evaporator 640, primary evaporator 610 transfers heat from first airflow 645 to the cool flow of refrigerant 605 passing through primary evaporator 610. As a result, first airflow 645 may be cooled to or below its dew point temperature, causing moisture in first airflow 645 to condense (thereby reducing the absolute humidity of first airflow 645). As an example, if first airflow 645 is 70° F./84% humidity, primary evaporator 610 may output second airflow 615 at 54° F./98% humidity. This may cause flow of refrigerant 605 to partially or completely vaporize within primary evaporator 610. For example, if flow of refrigerant 605 entering primary evaporator 610 is 128 psig/44° F./14% vapor, flow of refrigerant 605 may be 128 psig/52° F./100% vapor as it leaves primary evaporator 610. In certain embodiments, the liquid condensate from first airflow 645 may be collected in a drain pan connected to a condensate reservoir, as illustrated in FIG. 4. Additionally, the condensate reservoir may include a condensate pump that moves collected condensate, either continually or at periodic intervals, out of dehumidification system 600 (e.g., via a drain hose) to a suitable drainage or storage location.

The cooled first airflow 645 leaves primary evaporator 610 as second airflow 615 and enters secondary condenser 620. Secondary condenser 620 facilitates heat transfer from the hot flow of refrigerant 605 passing through the secondary condenser 620 to second airflow 615. This reheats second airflow 615, thereby decreasing the relative humidity of second airflow 615. As an example, if second airflow 615 is 54° F./98% humidity, secondary condenser 620 may output dehumidified airflow 625 at 65° F./68% humidity. This may cause flow of refrigerant 605 to partially or completely condense within secondary condenser 620. For example, if flow of refrigerant 605 entering secondary condenser 620 is 196 psig/68° F./38% vapor, flow of refrigerant 605 may be 196 psig/68° F./4% vapor as it leaves secondary condenser 620. In some embodiments, second airflow 615 leaves secondary condenser 620 as dehumidified airflow 625 and is output to a conditioned space.

Primary condenser 630 facilitates heat transfer from the hot flow of refrigerant 605 passing through the primary condenser 630 to a first outdoor airflow 606. This heats outdoor airflow 606, which is output to the unconditioned space (e.g., outdoors) as second outdoor airflow 608. As an example, if first outdoor airflow 606 is 65° F./68% humidity, primary condenser 630 may output second outdoor airflow 608 at 102° F./19% humidity. This may cause flow of refrigerant 605 to partially or completely condense within primary condenser 630. For example, if flow of refrigerant 605 entering primary condenser 630 is 340 psig/150° F./100% vapor, flow of refrigerant 605 may be 340 psig/105° F./60% vapor as it leaves primary condenser 630.

As described above, some embodiments of dehumidification system 600 may include a sub-cooling coil 650 in the airflow between an inlet of the condenser system 604 and primary condenser 630. Sub-cooling coil 650 facilitates heat transfer from the hot flow of refrigerant 605 passing through sub-cooling coil 650 to first outdoor airflow 606. This heats first outdoor airflow 606, thereby increasing the temperature of first outdoor airflow 606. As an example, if first outdoor airflow 606 is 65° F./68% humidity, sub-cooling coil 650 may output an airflow at 81° F./37% humidity. This may cause flow of refrigerant 605 to partially or completely condense within sub-cooling coil 650. For example, if flow of refrigerant 605 entering sub-cooling coil 650 is 340 psig/150° F./60% vapor, flow of refrigerant 605 may be 340 psig/80° F./0% vapor as it leaves sub-cooling coil 650.

In the embodiment depicted in FIGS. 6A and 6B, sub-cooling coil 650 is within condenser system 604. This configuration minimizes the temperature of third airflow 625, which is output into the conditioned space. An alternative embodiment is shown as dehumidification system 800 of FIGS. 8A and 8B in which dehumidification unit 802 includes sub-cooling coil 650. In these embodiments, airflow 625 first passes through sub-cooling coil 650 before being output to the conditioned space as airflow 855 via fan 670. As described herein, fan 670 can alternatively be located anywhere along the path of airflow in dehumidification unit 802, and one or more additional fans can be included in dehumidification unit 802.

Figure 8C:
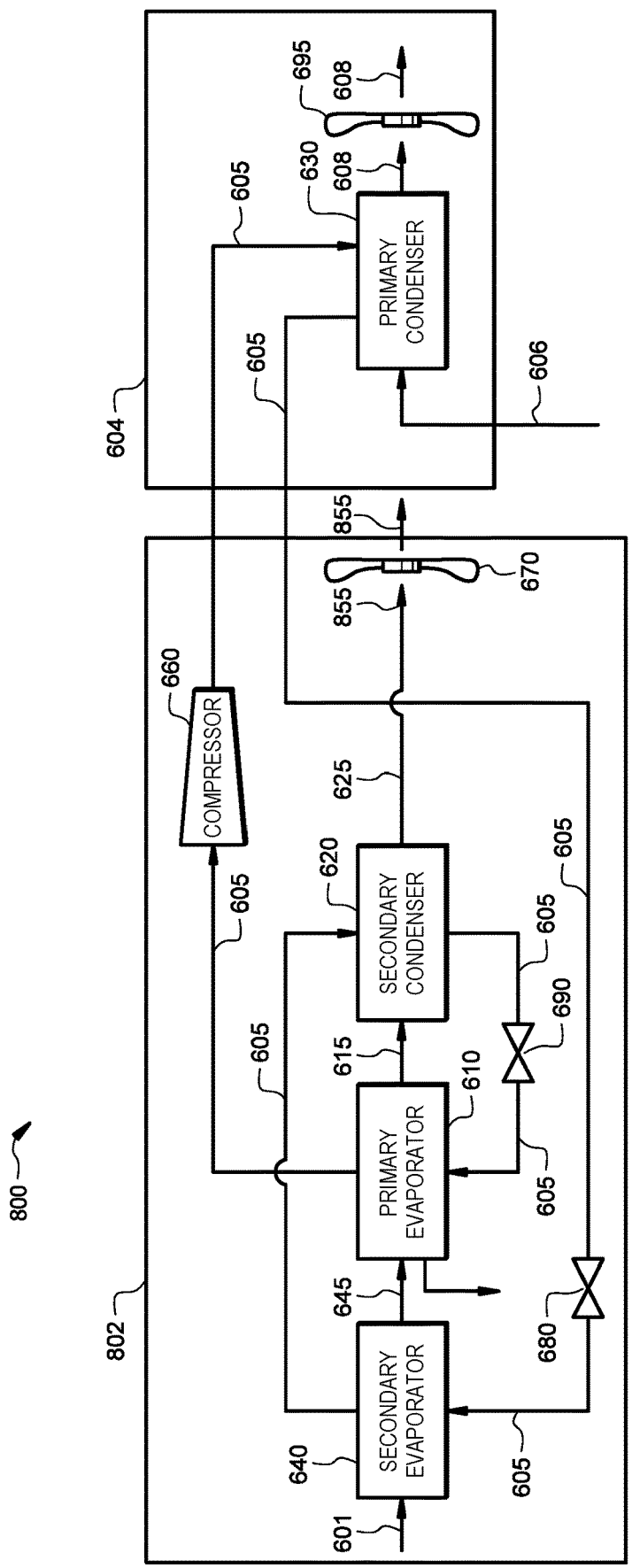

Without wishing to be bound to any particular theory, the configuration of dehumidification system 800 is believed to be more energy efficient under common operating conditions than that of dehumidification system 600 of FIGS. 6A-6B. For example, if the temperature of third airflow 625 is less than the outdoor temperature (i.e., the temperature of airflow 606), then refrigerant 605 will be more effectively cooled, or sub-cooled, with sub-cooling coil 650 placed in the dehumidification unit 802. Such operating conditions may be common, for example, in locations with warm climates and/or during summer months. As illustrated in FIG. 8B, indoor dehumidification unit 802 also includes compressor 660, which may, for example, be located near secondary evaporator 640, primary evaporator 610, and/or secondary condenser 620. In certain embodiments, the dehumidification unit 802 may comprise the compressor 660, but the dehumidification system 800 may lack the optional sub-cooling coil 650, as illustrated in FIG. 8C. The dehumidification system 800 of FIG. 8C may not require the sub-cooling coil 650 if, for example, the primary condenser 630 is operable to facilitate heat transfer from the flow of refrigerant 605 to a first outdoor airflow 606 in order to effectively condense the refrigerant prior to the flow of refrigerant entering a primary metering device 680.

In operation of example embodiments of dehumidification system 800, as illustrated in each of FIGS. 8A-8C, inlet air 601 may be drawn into dehumidification system 800 by fan 670. Inlet air 601 passes though secondary evaporator 640 in which heat is transferred from inlet air 601 to the cool flow of refrigerant 605 passing through secondary evaporator 640. As a result, inlet air 601 may be cooled. As an example, if inlet air 601 is 80° F./60% humidity, secondary evaporator 640 may output first airflow 645 at 70° F./84% humidity. This may cause flow of refrigerant 605 to partially vaporize within secondary evaporator 640. For example, if flow of refrigerant 605 entering secondary evaporator 640 is 196 psig/68° F./5% vapor, flow of refrigerant 605 may be 196 psig/68° F./38% vapor as it leaves secondary evaporator 640.

The cooled inlet air 601 leaves secondary evaporator 640 as first airflow 645 and enters primary evaporator 610. Like secondary evaporator 640, primary evaporator 610 transfers heat from first airflow 645 to the cool flow of refrigerant 605 passing through primary evaporator 610. As a result, first airflow 645 may be cooled to or below its dew point temperature, causing moisture in first airflow 645 to condense (thereby reducing the absolute humidity of first airflow 645). As an example, if first airflow 645 is 70° F./84% humidity, primary evaporator 610 may output second airflow 615 at 54° F./98% humidity. This may cause flow of refrigerant 605 to partially or completely vaporize within primary evaporator 610. For example, if flow of refrigerant 605 entering primary evaporator 610 is 128 psig/44° F./14% vapor, flow of refrigerant 605 may be 128 psig/52° F./100% vapor as it leaves primary evaporator 610. In certain embodiments, the liquid condensate from first airflow 645 may be collected in a drain pan connected to a condensate reservoir, as illustrated in FIG. 4. Additionally, the condensate reservoir may include a condensate pump that moves collected condensate, either continually or at periodic intervals, out of dehumidification system 800 (e.g., via a drain hose) to a suitable drainage or storage location.

The cooled first airflow 645 leaves primary evaporator 610 as second airflow 615 and enters secondary condenser 620. Secondary condenser 620 facilitates heat transfer from the hot flow of refrigerant 605 passing through the secondary condenser 620 to second airflow 615. This reheats second airflow 615, thereby decreasing the relative humidity of second airflow 615. As an example, if second airflow 615 is 54° F./98% humidity, secondary condenser 620 may output dehumidified airflow 625 at 65° F./68% humidity. This may cause flow of refrigerant 605 to partially or completely condense within secondary condenser 620. For example, if flow of refrigerant 605 entering secondary condenser 620 is 196 psig/68° F./38% vapor, flow of refrigerant 605 may be 196 psig/68° F./4% vapor as it leaves secondary condenser 620. In some embodiments, second airflow 615 leaves secondary condenser 620 as dehumidified airflow 625 and is output to a conditioned space.

In both FIGS. 8A and 8B, dehumidified airflow 625 enters sub-cooling coil 650, which facilitates heat transfer from the hot flow of refrigerant 605 passing through sub-cooling coil 650 to dehumidified airflow 625. This heats dehumidified airflow 625, thereby further decreasing the humidity of dehumidified airflow 625. As an example, if dehumidified airflow 625 is 65° F./68% humidity, sub-cooling coil 650 may output an airflow 855 at 81° F./37% humidity. This may cause flow of refrigerant 605 to partially or completely condense within sub-cooling coil 650. For example, if flow of refrigerant 605 entering sub-cooling coil 650 is 340 psig/150° F./60% vapor, flow of refrigerant 605 may be 340 psig/80° F./0% vapor as it leaves sub-cooling coil 650.

With reference back to each of FIGS. 8A-8C, primary condenser 630 facilitates heat transfer from the hot flow of refrigerant 605 passing through the primary condenser 630 to a first outdoor airflow 606. This heats outdoor airflow 606, which is output to the unconditioned space as second outdoor airflow 608. As an example, if first outdoor airflow 606 is 65° F./68% humidity, primary condenser 630 may output second outdoor airflow 608 at 102° F./19% humidity. This may cause flow of refrigerant 605 to partially or completely condense within primary condenser 630. For example, if flow of refrigerant 605 entering primary condenser 630 is 340 psig/150° F./100% vapor, flow of refrigerant 605 may be 340 psig/105° F./60% vapor as it leaves primary condenser 630.

Some embodiments of dehumidification systems 600 and 800 of FIGS. 6A-6B and 8A-8C may include a controller that may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, the controller may include any suitable combination of software, firmware, and hardware.

The controller may additionally include one or more processing modules. Each processing module may each include one or more microprocessors, controllers, or any other suitable computing devices or resources and may work, either alone or with other components of dehumidification systems 600 and 800, to provide a portion or all of the functionality described herein. The controller may additionally include (or be communicatively coupled to via wireless or wireline communication) computer memory. The memory may include any memory or database module and may take the form of volatile or non-volatile memory, including, without limitation, magnetic media, optical media, random access memory (RAM), read-only memory (ROM), removable media, or any other suitable local or remote memory component.

Although particular implementations of dehumidification systems 600 and 800 are illustrated and primarily described, the present disclosure contemplates any suitable implementation of dehumidification systems 600 and 800, according to particular needs. Moreover, although various components of dehumidification systems 600 and 800 have been depicted as being located at particular positions and relative to one another, the present disclosure contemplates those components being positioned at any suitable location, according to particular needs.

Figure 9:
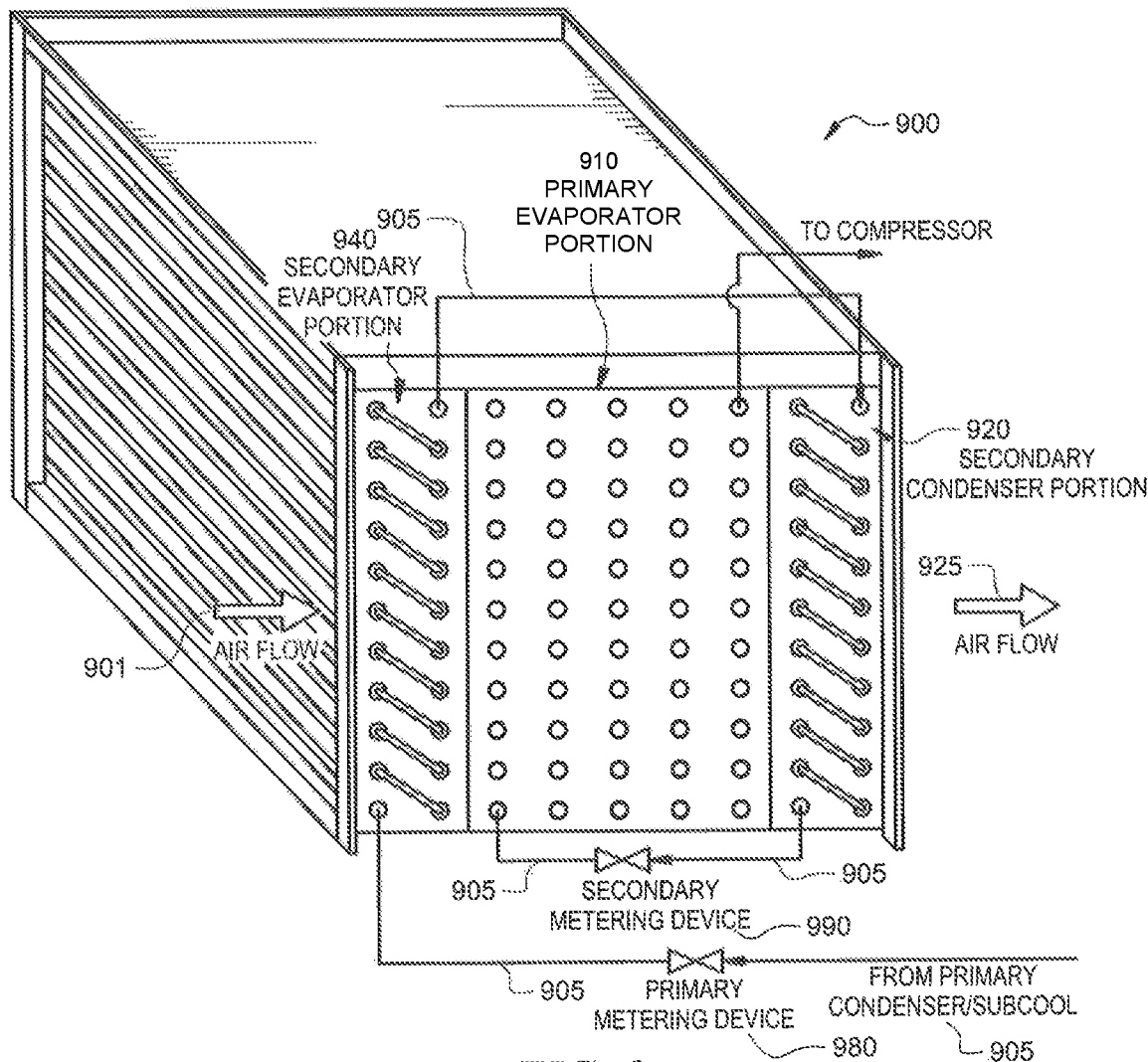
FIGS. 9 and 10 illustrate examples of single coil packs for use in the system described herein, according to certain embodiments.

In certain embodiments, the secondary evaporator (340, 640), primary evaporator (310, 610), and secondary condenser (320, 620) of FIG. 3, 6A-6B, or 8A-8C are combined in a single coil pack. The single coil pack may include portions (e.g., separate refrigerant circuits) to accommodate the respective functions of secondary evaporator, primary evaporator, and secondary condenser, described above. An illustrative example of such a single coil pack is shown in FIG. 9. FIG. 9 shows a single coil pack 900 which includes a plurality of coils (represented by circles in FIG. 9). Coil pack 900 includes a secondary evaporator portion 940, primary evaporator portion 910, and secondary condenser portion 920. The coil pack may include and/or be fluidly connectable to metering devices 980 and 990 as shown in the exemplary case of FIG. 9. In certain embodiments, metering devices 980 and 990 correspond to primary metering device 380 and secondary metering device 390 of FIG. 3.

In general, metering devices 980 and 990 may be any appropriate type of metering/expansion device. In some embodiments, metering device 980 is a thermostatic expansion valve (TXV) and secondary metering device 990 is a fixed orifice device (or vice versa). In general, metering devices 980 and 990 remove pressure from flow of refrigerant 905 to allow expansion or change of state from a liquid to a vapor in evaporator portions 910 and 940. The high-pressure liquid (or mostly liquid) refrigerant 905 entering metering devices 980 and 990 is at a higher temperature than the liquid refrigerant 905 leaving metering devices 980 and 990. For example, if flow of refrigerant 905 entering metering device 980 is 340 psig/80° F./0% vapor, flow of refrigerant 905 may be 196 psig/68° F./5% vapor as it leaves primary metering device 980. As another example, if flow of refrigerant 905 entering secondary metering device 990 is 196 psig/68° F./4% vapor, flow of refrigerant 905 may be 128 psig/44° F./14% vapor as it leaves secondary metering device 990. Refrigerant 905 may be any suitable refrigerant, as described above with respect to refrigerant 305 of FIG. 3.

In operation of example embodiments of the single coil pack 900, inlet airflow 901 passes though secondary evaporator portion 940 in which heat is transferred from inlet air 901 to the cool flow of refrigerant 905 passing through secondary evaporator portion 940. As a result, inlet air 901 may be cooled. As an example, if inlet air 901 is 80° F./60% humidity, secondary evaporator portion 940 may output first airflow at 70° F./84% humidity. This may cause flow of refrigerant 905 to partially vaporize within secondary evaporator portion 940. For example, if flow of refrigerant 905 entering secondary evaporator portion 940 is 196 psig/68° F./5% vapor, flow of refrigerant 905 may be 196 psig/68° F./38% vapor as it leaves secondary evaporator portion 940.

The cooled inlet air 901 proceeds through coil pack 900, reaching primary evaporator portion 910. Like secondary evaporator portion 940, primary evaporator portion 910 transfers heat from airflow 901 to the cool flow of refrigerant 905 passing through primary evaporator portion 910. As a result, airflow 901 may be cooled to or below its dew point temperature, causing moisture in airflow 901 to condense (thereby reducing the absolute humidity of airflow 901). As an example, if airflow 901 is 70° F./84% humidity, primary evaporator portion 910 may cool airflow 901 to 54° F./98% humidity. This may cause flow of refrigerant 905 to partially or completely vaporize within primary evaporator portion 910. For example, if flow of refrigerant 905 entering primary evaporator portion 910 is 128 psig/44° F./14% vapor, flow of refrigerant 905 may be 128 psig/52° F./100% vapor as it leaves primary evaporator portion 910. In certain embodiments, the liquid condensate from airflow through primary evaporator portion 910 may be collected in a drain pan connected to a condensate reservoir (e.g., as illustrated in FIG. 4 and described herein). Additionally, the condensate reservoir may include a condensate pump that moves collected condensate, either continually or at periodic intervals, out of coil pack 900 (e.g., via a drain hose) to a suitable drainage or storage location.

The cooled airflow 901 leaving primary evaporator portion 910 enters secondary condenser portion 920. Secondary condenser portion 920 facilitates heat transfer from the hot flow of refrigerant 905 passing through the secondary condenser portion 920 to airflow 901. This reheats airflow 901, thereby decreasing its relative humidity. As an example, if airflow 901 is 54° F./98% humidity, secondary condenser portion 920 may output an outlet airflow 925 at 65° F./68% humidity. This may cause flow of refrigerant 905 to partially or completely condense within secondary condenser portion 920. For example, if flow of refrigerant 905 entering secondary condenser portion 920 is 196 psig/68° F./38% vapor, flow of refrigerant 905 may be 196 psig/68° F./4% vapor as it leaves secondary condenser portion 920. Outlet airflow 925 may, for example, enter primary condenser portion 330 or sub-cooling coil 350 of FIG. 3.

Although a particular implementation of coil pack 900 is illustrated and primarily described, the present disclosure contemplates any suitable implementation of coil pack 900, according to particular needs. Moreover, although various components of coil pack 900 have been depicted as being located at particular positions, the present disclosure contemplates those components being positioned at any suitable location, according to particular needs.

Figure 10:
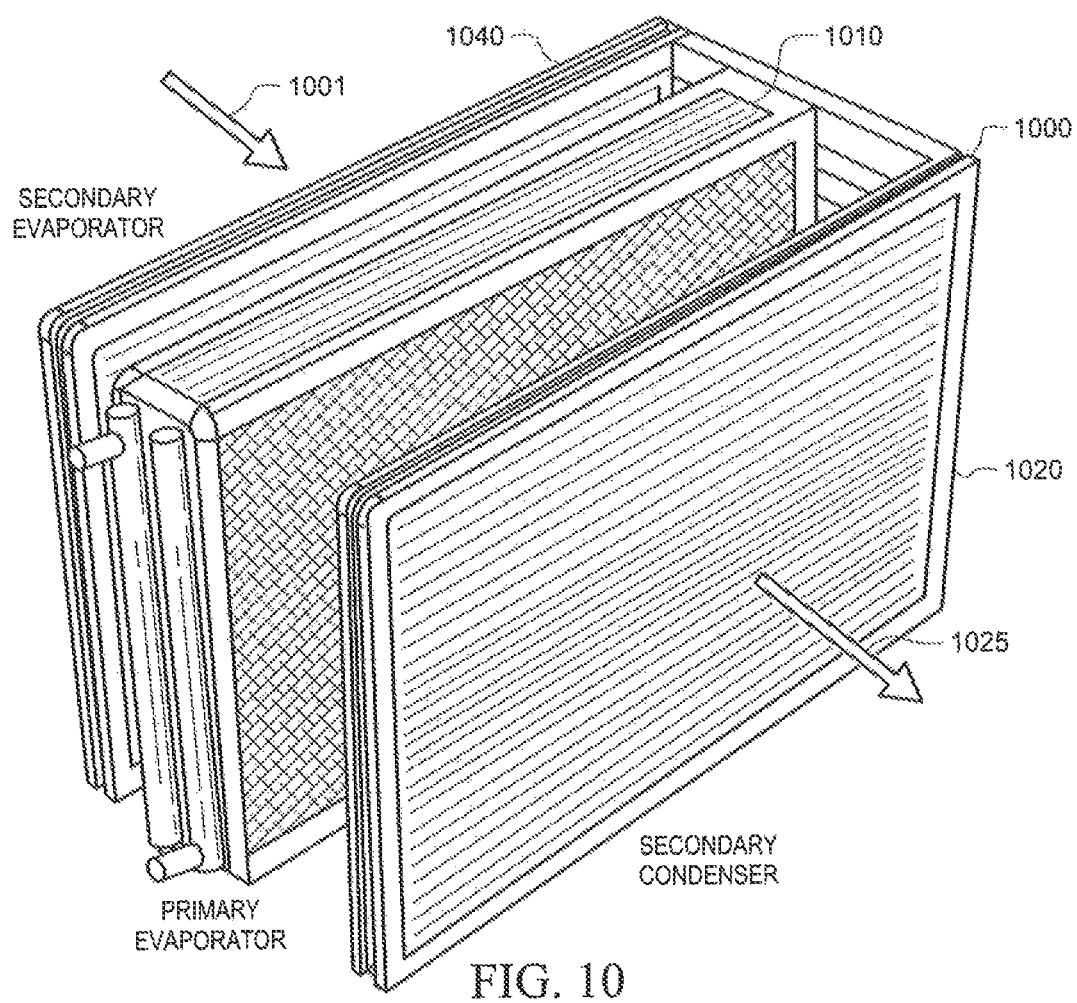
Figure 11:
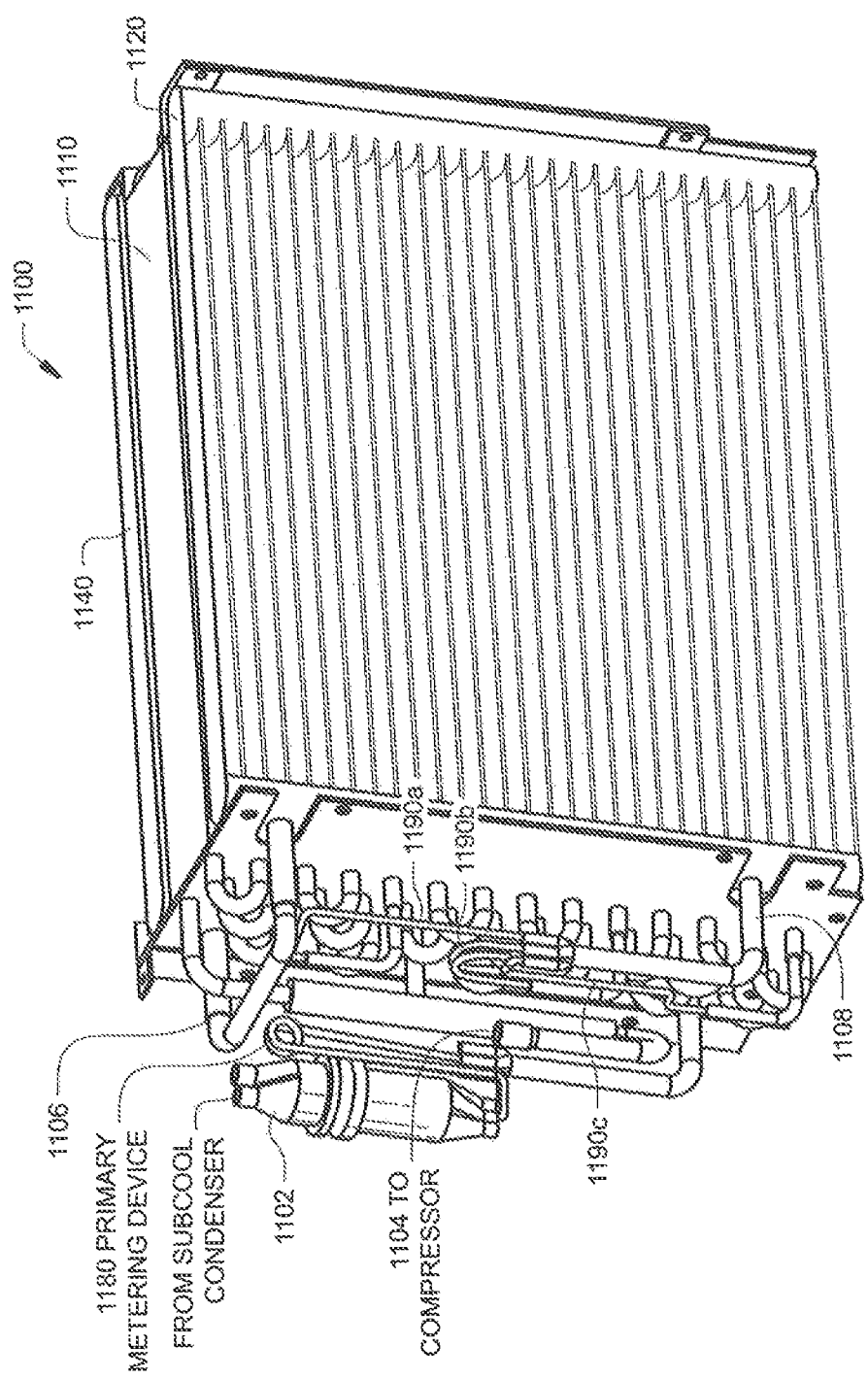
FIGS. 11, 12, 13, and 14 illustrate an example of a primary evaporator comprising three circuits for use in the system described herein, according to certain embodiments.
Figure 12:
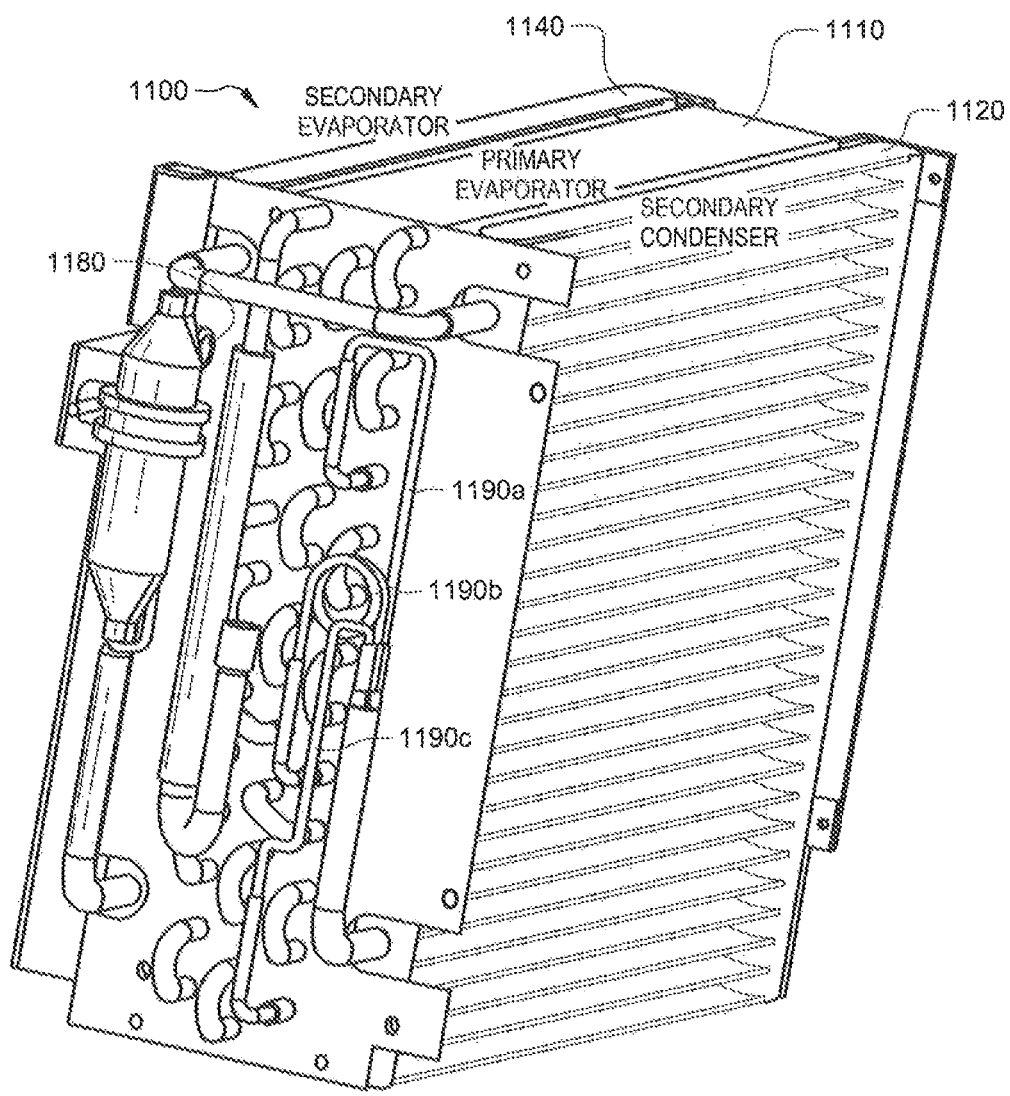
Figure 13:
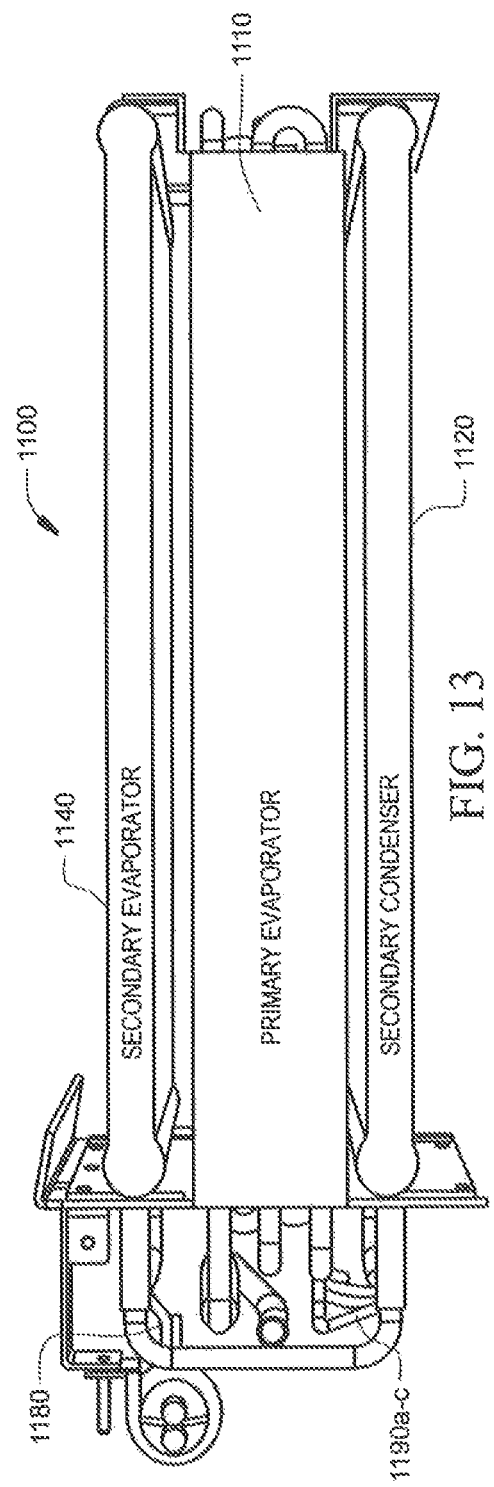

In certain embodiments, secondary evaporator (340, 640) and secondary condenser (320, 620) of FIG. 3, 6A-6B, or 8A-8C are combined in a single coil pack such that the single coil pack includes portions (e.g., separate refrigerant circuits) to accommodate the respective functions of the secondary evaporator and secondary condenser. An illustrative example of such an embodiment is shown in FIG. 10. FIG. 10 shows a single coil pack 1000 which includes a secondary evaporator portion 1040 and secondary condenser portion 1020. As shown in the illustrative example of FIG. 10, a primary evaporator 1010 is located between the secondary evaporator portion 1040 and secondary condenser portion 1020 of the single coil pack 1000. In this exemplary embodiment, the single coil pack 1000 is shown as a "U"-shaped coil. However, alternate embodiments may be used as long as flow airflow 1001 passes sequentially through secondary evaporator portion 1040, primary evaporator 1010, and secondary condenser portion 1020. In general, single coil pack 1000 can include the same or a different coil type compared to that of primary evaporator 1010. For example, single coil pack 1000 may include a microchannel coil type, while primary evaporator 1010 may include a fin tube coil type. This may provide further flexibility for optimizing a dehumidification system in which single coil pack 1000 and primary evaporator 1010 are used.

In operation of example embodiments of the single coil pack 1000, inlet air 1001 passes though secondary evaporator portion 1040 in which heat is transferred from inlet air 1001 to the cool flow of refrigerant passing through secondary evaporator portion 1040. As a result, inlet air 1001 may be cooled. As an example, if inlet air 1001 is 80° F./60% humidity, secondary evaporator portion 1040 may output airflow at 70° F./84% humidity. This may cause flow of refrigerant to partially vaporize within secondary evaporator portion 1040. For example, if flow of refrigerant entering secondary evaporator 1040 is 196 psig/68° F./5% vapor, flow of refrigerant 1005 may be 196 psig/68° F./38% vapor as it leaves secondary evaporator portion 1040.

The cooled inlet air 1001 leaves secondary evaporator portion 1040 and enters primary evaporator 1010. Like secondary evaporator portion 1040, primary evaporator 1010 transfers heat from airflow 1001 to the cool flow of refrigerant passing through primary evaporator 1010. As a result, airflow 1001 may be cooled to or below its dew point temperature, causing moisture in airflow 1001 to condense (thereby reducing the absolute humidity of airflow 1001). As an example, if airflow 1001 entering primary evaporator 1010 is 70° F./84% humidity, primary evaporator 1010 may output airflow at 54° F./98% humidity. This may cause flow of refrigerant to partially or completely vaporize within primary evaporator 1010. For example, if flow of refrigerant entering primary evaporator 1010 is 128 psig/44° F./14% vapor, flow of refrigerant may be 128 psig/52° F./100% vapor as it leaves primary evaporator 1010. In certain embodiments, the liquid condensate from airflow 1010 may be collected in a drain pan connected to a condensate reservoir, as illustrated in FIG. 4. Additionally, the condensate reservoir may include a condensate pump that moves collected condensate, either continually or at periodic intervals, out of primary evaporator 1010, and the associated dehumidification system (e.g., via a drain hose) to a suitable drainage or storage location.

The cooled airflow 1001 leaves primary evaporator 1010 and enters secondary condenser portion 1020. Secondary condenser portion 1020 facilitates heat transfer from the hot flow of refrigerant passing through the secondary condenser 1020 to airflow 1001. This reheats airflow 1001, thereby decreasing its relative humidity. As an example, if airflow 1001 entering secondary condenser portion 1020 is 54° F./98% humidity, secondary condenser 1020 may output airflow 1025 at 65° F./68% humidity. This may cause flow of refrigerant to partially or completely condense within secondary condenser 1020. For example, if flow of refrigerant entering secondary condenser portion 1020 is 196 psig/68° F./38% vapor, flow of refrigerant may be 196 psig/68° F./4% vapor as it leaves secondary condenser 1020. Outlet airflow 925 may, for example, enter primary condenser 330 or sub-cooling cooling 350 of FIG. 3.

Although a particular implementation of coil pack 1000 is illustrated and primarily described, the present disclosure contemplates any suitable implementation of coil pack 1000, according to particular needs. Moreover, although various components of coil pack 1000 have been depicted as being located at particular positions, the present disclosure contemplates those components being positioned at any suitable location, according to particular needs.

In certain embodiments, one or both of the secondary evaporator (340, 640) and primary evaporator (310, 610) of FIG. 3, 6A-6B, or 8A-8C are subdivided into two or more circuits. In such embodiments, each circuit of the subdivided evaporator(s) is fed refrigerant by a corresponding metering device. The metering devices may include passive metering devices, active metering devices, or combinations thereof. For example, metering device 380 (or 690) may be an active thermostatic expansion valve (TXV) and secondary metering device 390 (or 690) may be a passive fixed orifice device (or vice versa). The metering devices may be configured to feed refrigerant to each circuit within the evaporators at a desired mass flow rate. Metering devices for feeding refrigerant to each circuit of the subdivided evaporator(s) may be used in combination with metering devices 380 and 390 or may replace one or both of metering devices 380 and 390.

FIGS. 11, 12, 13, and 14 show an illustrative example of a portion 1100 of a dehumidification system in which the primary evaporator 1110 comprises three circuits for flow of refrigerant, according to certain embodiments. Portion 1100 includes a primary metering device 1180, secondary metering devices 1190a-c, a secondary evaporator 1140, a primary evaporator 1110, and a secondary condenser 1120. Primary evaporator 1110 includes three circuits for receiving flow of refrigerant from secondary metering devices 1190a-c. In the example of FIGS. 11, 12, 13, and 14, each of secondary metering devices 1190a-c is a passive metering device (i.e., with an orifice of a fixed inner diameter and length). It should, however be understood that one or more (up to all) of the secondary metering devices 1190a-c may be active metering devices (e.g., thermostatic expansion valves).

In operation of example embodiments of portion 1100 of a dehumidification system, flow of cooled (or sub-cooled) refrigerant is received at inlet 1102, for example, from sub-cooling coil 350 or primary condenser 330 of dehumidification system 300 of FIG. 3. Primary metering device 1180 determines the flow rate of refrigerant into secondary evaporator 1140. While FIGS. 11, 12, 13, and 14 are shown to have a single primary metering device 1180, other embodiments can include multiple primary metering devices in parallel (e.g., if the secondary evaporator 1140 comprises two or more circuits for flow of refrigerant).

As the cooled refrigerant passes through secondary evaporator 1140, heat is exchanged between the refrigerant and airflow passing through secondary evaporator 1140, cooling the inlet air. As an example, if inlet air is 80° F./60% humidity, secondary evaporator 1140 may output airflow at 70° F./84% humidity. This may cause flow of refrigerant to partially vaporize within secondary evaporator 1140. For example, if flow of refrigerant entering secondary evaporator 1140 is 196 psig/68° F./5% vapor, flow of refrigerant may be 196 psig/68° F./38% vapor as it leaves secondary evaporator 1140.

Secondary condenser 1120 receives warmed refrigerant from secondary evaporator 1140 via tube 1106. Secondary condenser 1120 facilitates heat transfer from the hot flow of refrigerant passing through the secondary condenser 1120 to the airflow. This reheats the airflow, thereby decreasing its relative humidity. As an example, if the airflow is 54° F./98% humidity, secondary condenser 1120 may output an airflow at 65° F./68% humidity. This may cause flow of refrigerant to partially or completely condense within secondary condenser 1120. For example, if flow of refrigerant entering secondary condenser 1120 is 196 psig/68° F./38% vapor, flow of refrigerant may be 196 psig/68° F./4% vapor as it leaves secondary condenser 1120.

Figure 14:
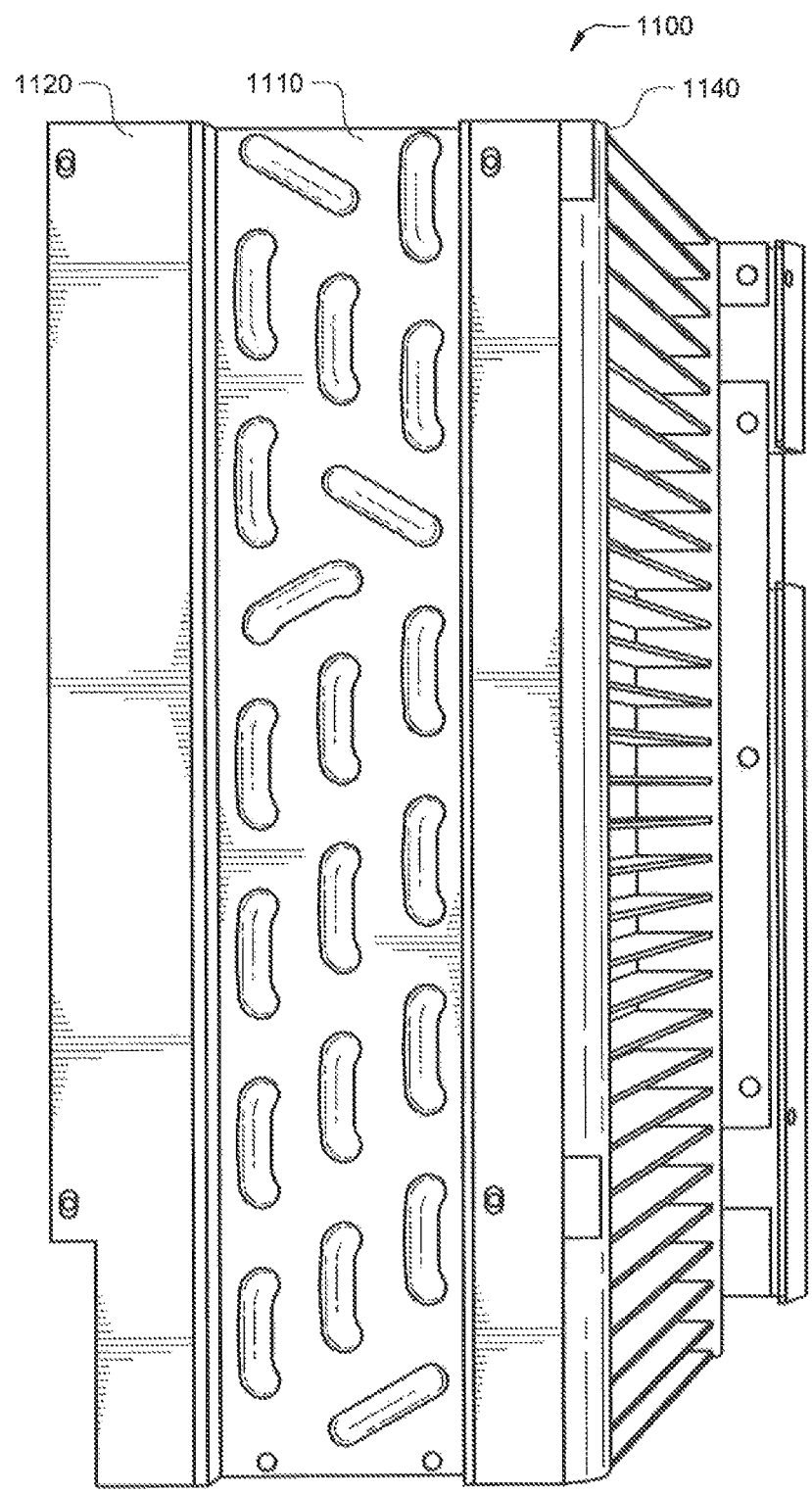

The cooled refrigerant exits the secondary condenser at 1108 and is received by metering devices 1190a-c, which distributes the flow of refrigerant into the three circuits of primary evaporator 1110. FIG. 14 shows a view which includes the circuiting of primary evaporator 1110. Airflow passing through primary evaporator 1110 may be cooled to or below its dew point temperature, causing moisture in the airflow to condense (thereby reducing the absolute humidity of the air). As an example, if the airflow is 70° F./84% humidity, primary evaporator 1110 may output airflow at 54° F./98% humidity. This may cause flow of refrigerant to partially or completely vaporize within primary evaporator 1110.

Each of secondary metering devices 1190a, 1190b, and 1190c is configured to provide flow of refrigerant to each circuit of primary evaporator 1110 at a desired flow rate. For example, the flow rate provided to each circuit may be optimized to improve performance of the primary evaporator 1110. For example, under certain operating conditions, it may be beneficial to prevent the entire flow of refrigerant from passing through the entire evaporator, as occurs in a traditional evaporator coil. Refrigerant flowing through such an evaporator might undergo a change from liquid to gas phase before exiting the coil, resulting in poor performance in the potion of the evaporator that only contacts gaseous refrigerant. To significantly reduce or eliminate this problem, the present disclosure provides for refrigerant flow at a desired flow rate through each circuit. The desired flow rate may be predetermined (e.g., based on known design criteria and/or operating conditions) and/or variable (e.g., manually and/or automatically adjustable in real time) during operation. The flow rate may be configured such that the flow of refrigerant exits its respective circuit just after transitioning to a gas. For example, the rate of airflow near the edges of an evaporator may be less than near the center of the evaporator. Therefore, a lower rate of refrigerant flow may be supplied by secondary metering devices 1190a-c to the circuits corresponding to the edge of primary evaporator 1110.

While the example of FIGS. 11, 12, 13, and 14 include a primary evaporator that is subdivided into two or more circuits. In other embodiments, secondary evaporator 1110 may also, or alternatively, be subdivided into two or more circuits. It should also be appreciated that the circuiting exemplified by FIGS. 11, 12, 13, and 14 can also be achieved in single coil packs such as those shown in FIGS. 9 and 10.

Although a particular implementation of portion 1100 of a dehumidification system is illustrated and primarily described, the present disclosure contemplates any suitable implementation of portion 1100 of a dehumidification system, according to particular needs. Moreover, although various components of portion 1100 of a dehumidification system have been depicted as being located at particular positions, the present disclosure contemplates those components being positioned at any suitable location, according to particular needs.

Figure 15A:
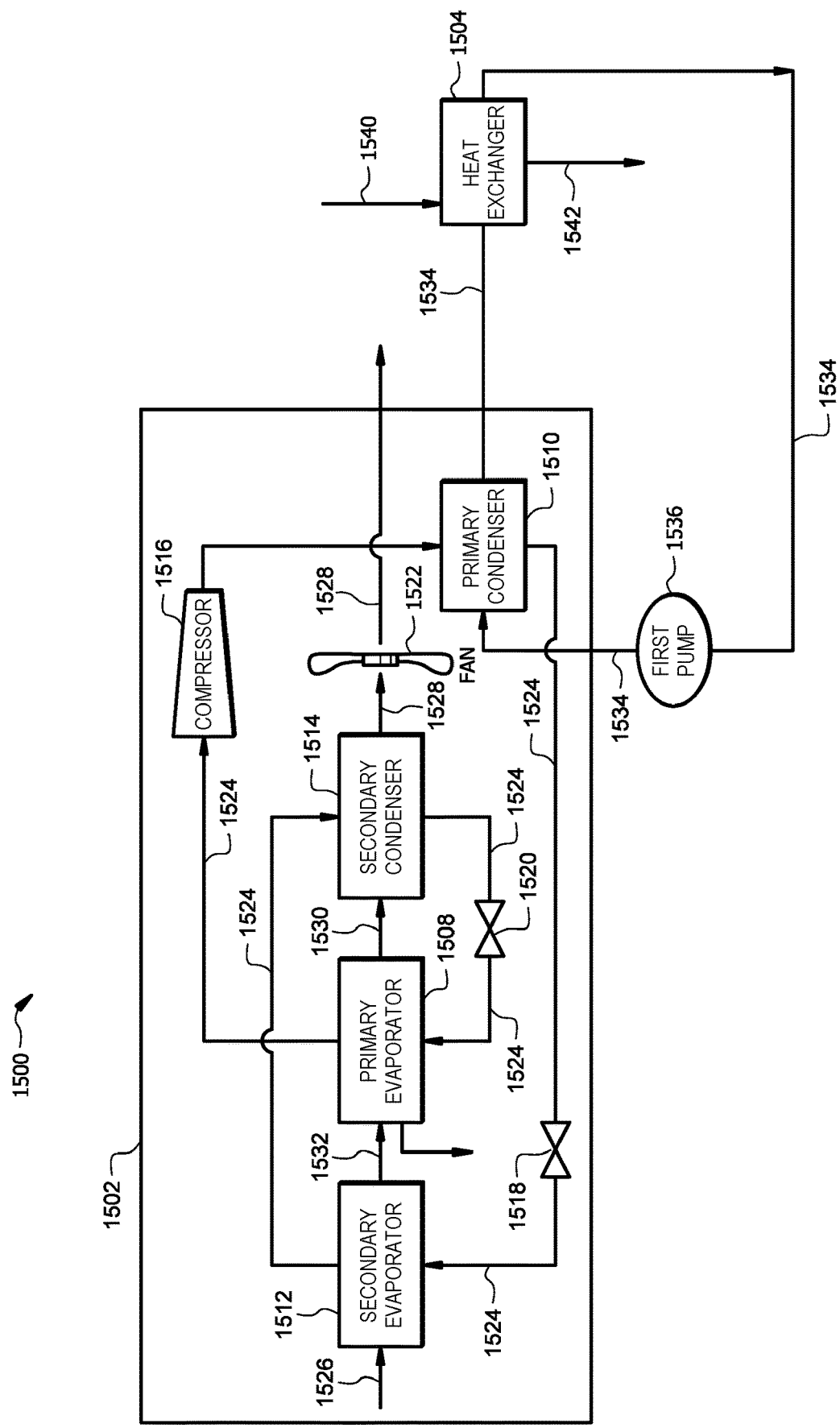
FIGS. 15A and 15B illustrate an example dehumidification system with a liquid cooled condenser, according to certain embodiments.
Figure 15B:
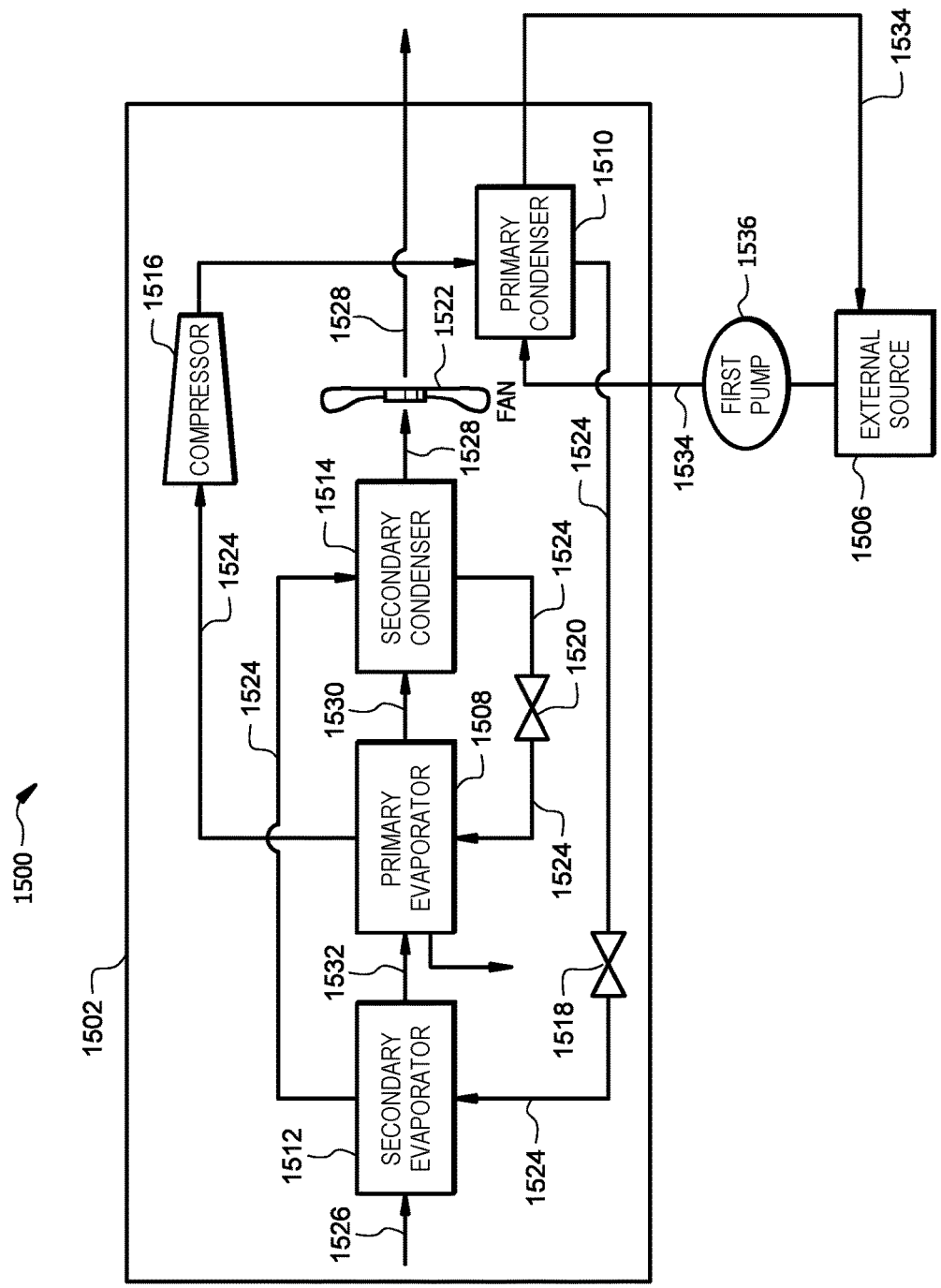

FIGS. 15A-15B illustrate an example dehumidification system 1500 that may be used in accordance with dehumidification system 300 of FIG. 3 to reduce the humidity of air within a structure. Dehumidification system 1500 includes a dehumidification unit 1502, which is generally indoors, and a heat exchanger 1504 or an external source 1506 configured to contain a volume of a fluid operable to be used by the dehumidification system 1500 to cool a separate fluid flow within the dehumidification unit 1502. FIG. 15A illustrates the dehumidification system 1500 comprising the heat exchanger 1504, and FIG. 15B illustrates the dehumidification system comprising the external source 1506. With reference to both FIGS. 15A-15B, dehumidification unit 1502 includes a primary evaporator 1508, a primary condenser 1510, a secondary evaporator 1512, a secondary condenser 1514, a compressor 1516, a primary metering device 1518, a secondary metering device 1520, and a fan 1522.

With continued reference to both FIGS. 15A-15B, a flow of refrigerant 1524 is circulated through dehumidification unit 1502 as illustrated. In general, dehumidification unit 1502 receives an inlet airflow 1526, removes water from inlet airflow 1526, and discharges dehumidified air 1528. Water is removed from inlet air 1526 using a refrigeration cycle of flow of refrigerant 1524. By including secondary evaporator 1512 and secondary condenser 1514, however, dehumidification system 1500 causes at least part of the flow of refrigerant 1524 to evaporate and condense twice in a single refrigeration cycle. This increases the refrigeration capacity over typical systems without adding any additional power to the compressor, thereby increasing the overall dehumidification efficiency of the system.

In general, dehumidification system 1500 attempts to match the saturating temperature of secondary evaporator 1512 to the saturating temperature of secondary condenser 1514. The saturating temperature of secondary evaporator 1512 and secondary condenser 1514 generally is controlled according to the equation: (temperature of inlet air 1526+ temperature of a second airflow 1530)/2. As the saturating temperature of secondary evaporator 1512 is lower than inlet air 1526, evaporation happens in secondary evaporator 1512. As the saturating temperature of secondary condenser 1514 is higher than second airflow 1530, condensation happens in the secondary condenser 1514. The amount of refrigerant 1524 evaporating in secondary evaporator 1512 is substantially equal to that condensing in secondary condenser 1514.

Primary evaporator 1508 receives flow of refrigerant 1524 from secondary metering device 1520 and outputs flow of refrigerant 1524 to compressor 1516. Primary evaporator 1508 may be any suitable type of coil (e.g., fin tube, micro channel, etc.). Primary evaporator 1508 receives a first airflow 1532 from secondary evaporator 1512 and outputs second airflow 1530 to secondary condenser 514. Second airflow 1530, in general, is at a cooler temperature than first airflow 1532. To cool incoming first airflow 1532, primary evaporator 1508 transfers heat from first airflow 1532 to flow of refrigerant 1524, thereby causing flow of refrigerant 1524 to evaporate at least partially from liquid to gas. This transfer of heat from first airflow 1532 to flow of refrigerant 1524 also removes water from first airflow 1532.

Secondary condenser 1514 receives flow of refrigerant 1524 from secondary evaporator 1512 and outputs flow of refrigerant 1524 to secondary metering device 1520. Secondary condenser 1514 may be any type of coil (e.g., fin tube, micro channel, etc.). Secondary condenser 1514 receives second airflow 1530 from primary evaporator 1508 and outputs dehumidified airflow 1528. Dehumidified airflow 1528 is, in general, warmer and drier (i.e., the dew point will be the same but relative humidity will be lower) than second airflow 1530. Secondary condenser 1514 generates dehumidified airflow 1528 by transferring heat from flow of refrigerant 1524 to second airflow 1530, thereby causing flow of refrigerant 1524 to condense at least partially from gas to liquid.

Primary condenser 1510 receives flow of refrigerant 1524 from compressor 1516 and outputs flow of refrigerant 1524 to primary metering device 1518. Primary condenser 1510 may be any type of liquid-cooled heat exchanger operable to transfer heat from the flow of refrigerant 1524 to the flow of a fluid 1534. In embodiments, the fluid 1534 may be any suitable fluid, such as water or a mixture of water and glycol.

Primary condenser 1510 receives both the flow of fluid 1534 and the flow of refrigerant 1524 during operation of dehumidification system 1500, wherein the primary condenser 1510 is operable to transfer heat from the flow of refrigerant 1524, thereby causing flow of refrigerant 1524 to condense at least partially from gas to liquid. In some embodiments, primary condenser 1510 completely condenses flow of refrigerant 1524 to a liquid (i.e., 100% liquid). In other embodiments, primary condenser 1510 partially condenses flow of refrigerant 1524 to a liquid (i.e., less than 100% liquid).

As illustrated, the dehumidification system 1500 may further comprise a first water pump 1536. The first water pump 1536 may be disposed internal or external to the dehumidification unit 1502. The first water pump 1536 may be any suitable device operable to provide for the flow of fluid 1534. As depicted in FIG. 15A, the first water pump 1536 may be disposed at any suitable position in relation to the primary condenser 1510 and the heat exchanger 1504 operable to cycle the flow of fluid 1534 between the heat exchanger 1504 and the primary condenser 1510. As depicted in FIG. 15B, the first water pump 1536 may be disposed at any suitable position in relation to the primary condenser 1510 and the external source 1506 operable to cycle the flow of fluid 1534 between the external source 1506 and the primary condenser 1510.

With reference to FIG. 15A, heat exchanger 1504 may receive the flow of fluid 1534 from primary condenser 1510 at a first temperature and output flow of fluid 1534 to primary condenser 1510 at a second temperature after transferring heat away from the flow of fluid 1534, wherein the second temperature is lower than the first temperature. Heat exchanger 1504 may be any suitable type of heat exchanger, such as, for example, a cooling tower or a dry cooler. Heat exchanger 1504 receives the flow of fluid 1534 and a first outdoor airflow 1540, wherein heat is transferred between the flow of fluid 1534 and the first outdoor airflow 1540. Heat exchanger 1504 may further output the flow of fluid 1534 and a second outdoor airflow 1542, wherein the flow of fluid 1534 leaving the heat exchanger 1504 is at a lower temperature than the flow of fluid 1534 received by the heat exchanger 1504, and the second outdoor airflow 1542 is at a greater temperature than the first outdoor airflow 1540.

In embodiments wherein the heat exchanger 1504 is a cooling tower, the heat exchanger 1504 may be operable to dispense the flow of fluid 1534 within its internal structure, wherein the fluid 1534 directly contacts the first outdoor airflow 1540 as the fluid 1534 flows through the heat exchanger 1504 and transfers heat to the first outdoor airflow 1540. At least a portion of the fluid 1534 may evaporate and exit to the atmosphere as the heat transfers from the fluid 1534 to the first outdoor airflow 1540, and the heat exchanger 1504 may collect a remaining portion of the fluid 1534 after transferring heat to the first outdoor airflow 1540, wherein the remaining portion of the fluid 1534 is at a lower temperature. In embodiments wherein the heat exchanger 1504 is a dry cooler, the heat exchanger 1504 may be operable to induce the first outdoor airflow 1540 to flow through the heat exchanger 1504 where heat transfers indirectly between the first outdoor airflow 1540 and the flow of fluid 1534. In these embodiments, heat transfer would not result in loss of a portion of the fluid 1534 through evaporation to the atmosphere.

With reference now to FIG. 15B, external source 1506 may receive the flow of fluid 1534 from the primary condenser 1510 and output flow of fluid 1534 to the primary condenser 1510 via first water pump 1536. External source 1506 may be configured to contain and/or store a volume of fluid 1534 to be used by primary condenser 1510 to lower the temperature of the flow of refrigerant 1524 in the dehumidification unit 1502. The external source 1506 may be configured to receive the flow of fluid 1534 from primary condenser 1510 at a first temperature and output flow of fluid 1534 to primary condenser 1510 at a second temperature after transferring heat away from the flow of fluid 1534, wherein the second temperature is lower than the first temperature. Without limitations, the external source 1506 may be any suitable number and combination of a ground reservoir, a natatorium, and an outdoor body of water, among others. In embodiments wherein the external source 1506 is a ground reservoir, the external source 1506 may implement an open or closed ground water system, wherein the conduit providing for the flow of fluid 1534 within the ground reservoir may be disposed substantially parallel to a horizontal plane of the ground surface, substantially perpendicular to the horizontal plane of the ground surface, or combinations thereof.

With reference to both FIGS. 15A-15B, secondary evaporator 1512 receives flow of refrigerant 1524 from primary metering device 1518 and outputs flow of refrigerant 1524 to secondary condenser 1514. Secondary evaporator 1512 may be any type of coil (e.g., fin tube, micro channel, etc.). Secondary evaporator 1512 receives inlet air 1526 and outputs first airflow 1532 to primary evaporator 1508. First airflow 1532, in general, is at a cooler temperature than inlet air 1526. To cool incoming inlet air 1526, secondary evaporator 1512 transfers heat from inlet air 1526 to flow of refrigerant 1524, thereby causing flow of refrigerant 1524 to evaporate at least partially from liquid to gas.

Compressor 1516 pressurizes flow of refrigerant 1524, thereby increasing the temperature of refrigerant 1524. For example, if flow of refrigerant 1524 entering compressor 1516 is 128 psig/52° F./100% vapor, flow of refrigerant 1524 may be 340 psig/150° F./100% vapor as it leaves compressor 1516. Compressor 1516 receives flow of refrigerant 1524 from primary evaporator 1508 and supplies the pressurized flow of refrigerant 1524 to primary condenser 1510.

Fan 1522 may include any suitable components operable to draw inlet air 1526 into dehumidification unit 1502 and through secondary evaporator 1512, primary evaporator 1508, and secondary condenser 1514. Fan 1522 may be any type of air mover (e.g., axial fan, forward inclined impeller, and backward inclined impeller, etc.). For example, fan 1522 may be a backward inclined impeller positioned adjacent to secondary condenser 1514. While fan 1522 is depicted as being located adjacent to secondary condenser 1514, it should be understood that fan 1522 may be located anywhere along the airflow path of dehumidification unit 1502. For example, fan 1522 may be positioned in the airflow path of any one of airflows 1526, 1532, 1530, or 1528. Moreover, dehumidification unit 1502 may include one or more additional fans positioned within any one or more of these airflow paths.

Primary metering device 1518 and secondary metering device 1520 are any appropriate type of metering/expansion device. In some embodiments, primary metering device 1518 is a thermostatic expansion valve (TXV) and secondary metering device 1520 is a fixed orifice device (or vice versa). In certain embodiments, metering devices 1518 and 1520 remove pressure from flow of refrigerant 1524 to allow expansion or change of state from a liquid to a vapor in evaporators 1512 and 1508. The high-pressure liquid (or mostly liquid) refrigerant 1524 entering metering devices 1518 and 1520 is at a higher temperature than the liquid refrigerant 1524 leaving metering devices 1518 and 1520. For example, if flow of refrigerant 1524 entering primary metering device 1518 is 340 psig/80° F./0% vapor, flow of refrigerant 1524 may be 196 psig/68° F./5% vapor as it leaves primary metering device 1518. As another example, if flow of refrigerant 1524 entering secondary metering device 1520 is 196 psig/68° F./4% vapor, flow of refrigerant 1524 may be 128 psig/44° F./14% vapor as it leaves secondary metering device 1520.

Refrigerant 1524 may be any suitable refrigerant such as R410a. In general, dehumidification system 1500 utilizes a closed refrigeration loop of refrigerant 1524 that passes from compressor 1516 through primary condenser 1510, primary metering device 1518, secondary evaporator 1512, secondary condenser 1514, secondary metering device 1520, and primary evaporator 1508. Compressor 1516 pressurizes flow of refrigerant 1524, thereby increasing the temperature of refrigerant 1524. Primary condenser 1510, which may include any suitable water-cooled heat exchanger, cools the pressurized flow of refrigerant 1524 by facilitating heat transfer from the flow of refrigerant 1524 to the flow of fluid provided by the external source 1506 passing through it (i.e., flow of fluid 1534). Secondary condenser, which may include any suitable air-cooled heat exchanger, cools the pressurized flow of refrigerant 1524 by facilitating heat transfer from the flow of refrigerant 1524 to the respective airflow passing through it (i.e., second airflow 1530).

The cooled flow of refrigerant 1524 leaving primary and secondary condensers 1510 and 1514 may enter a respective expansion device (i.e., primary metering device 1518 and secondary metering device 1520) that is operable to reduce the pressure of flow of refrigerant 1524, thereby reducing the temperature of flow of refrigerant 1524. Primary and secondary evaporators 1508 and 1512, which may include any suitable heat exchanger, receive flow of refrigerant 1524 from secondary metering device 1520 and primary metering device 1518, respectively. Primary and secondary evaporators 1508 and 1512 facilitate the transfer of heat from the respective airflows passing through them (i.e., inlet air 1526 and first airflow 1532) to flow of refrigerant 1524. Flow of refrigerant 1524, after leaving primary evaporator 1508, passes back to compressor 1516, and the cycle is repeated.

In certain embodiments, the above-described refrigeration loop may be configured such that evaporators 1508 and 1512 operate in a flooded state. In other words, flow of refrigerant 1524 may enter evaporators 1508 and 1512 in a liquid state, and a portion of flow of refrigerant 1524 may still be in a liquid state as it exits evaporators 1508 and 1512. Accordingly, the phase change of flow of refrigerant 1524 (liquid to vapor as heat is transferred to flow of refrigerant 1524) occurs across evaporators 1508 and 1512, resulting in nearly constant pressure and temperature across the entire evaporators 1508 and 1512 (and, as a result, increased cooling capacity).

In operation of example embodiments of dehumidification system 1500, inlet air 1526 may be drawn into dehumidification unit 1502 by fan 1522. Inlet air 1526 passes though secondary evaporator 1512 in which heat is transferred from inlet air 1526 the cool flow of refrigerant 1524 passing through secondary evaporator 1512. As a result, inlet air 1526 may be cooled. As an example, if inlet air 1526 is 80° F./60% humidity, secondary evaporator 1512 may output first airflow 1532 at 70° F./84% humidity. This may cause flow of refrigerant 1524 to partially vaporize within secondary evaporator 1512. For example, if flow of refrigerant 1524 entering secondary evaporator 1512 is 196 psig/ 68° F./5% vapor, flow of refrigerant 1524 may be 196 psig/68° F./38% vapor as it leaves secondary evaporator 1512.

The cooled inlet air 1526 leaves secondary evaporator 1512 as first airflow 1532 and enters primary evaporator 1508. Like secondary evaporator 1512, primary evaporator 1508 transfers heat from first airflow 1532 to the cool flow of refrigerant 1524 passing through primary evaporator 1508. As a result, first airflow 1532 may be cooled to or below its dew point temperature, causing moisture in first airflow 1532 to condense (thereby reducing the absolute humidity of first airflow 1532). As an example, if first airflow 1532 is 70° F./84% humidity, primary evaporator 1508 may output second airflow 1530 at 54° F./98% humidity. This may cause flow of refrigerant 1524 to partially or completely vaporize within primary evaporator 1508. For example, if flow of refrigerant 1524 entering primary evaporator 1508 is 128 psig/44° F./14% vapor, flow of refrigerant 1524 may be 128 psig/52° F./100% vapor as it leaves primary evaporator 1508.

The cooled first airflow 1532 leaves primary evaporator 1508 as second airflow 1530 and enters secondary condenser 1514. Secondary condenser 1514 facilitates heat transfer from the hot flow of refrigerant 1524 passing through the secondary condenser 1514 to second airflow 1530. This reheats second airflow 1530, thereby decreasing the relative humidity of second airflow 1530. As an example, if second airflow 1530 is 54° F./98% humidity, secondary condenser 1514 may output dehumidified airflow 1528 at 65° F./68% humidity. This may cause flow of refrigerant 1524 to partially or completely condense within secondary condenser 1514. For example, if flow of refrigerant 1524 entering secondary condenser 1514 is 196 psig/68° F./38% vapor, flow of refrigerant 1524 may be 196 psig/68° F./4% vapor as it leaves secondary condenser 1514.

Some embodiments of dehumidification system 1500 may include a controller that may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, the controller may include any suitable combination of software, firmware, and hardware.

The controller may additionally include one or more processing modules. Each processing module may each include one or more microprocessors, controllers, or any other suitable computing devices or resources and may work, either alone or with other components of dehumidification system 1500, to provide a portion or all of the functionality described herein. The controller may additionally include (or be communicatively coupled to via wireless or wireline communication) computer memory. The memory may include any memory or database module and may take the form of volatile or non-volatile memory, including, without limitation, magnetic media, optical media, random access memory (RAM), read-only memory (ROM), removable media, or any other suitable local or remote memory component.

Although particular implementations of dehumidification system 1500 are illustrated and primarily described, the present disclosure contemplates any suitable implementation of dehumidification system 1500, according to particular needs. Moreover, although various components of dehumidification system 1500 have been depicted as being located at particular positions and relative to one another, the present disclosure contemplates those components being positioned at any suitable location, according to particular needs.

Figure 16A:
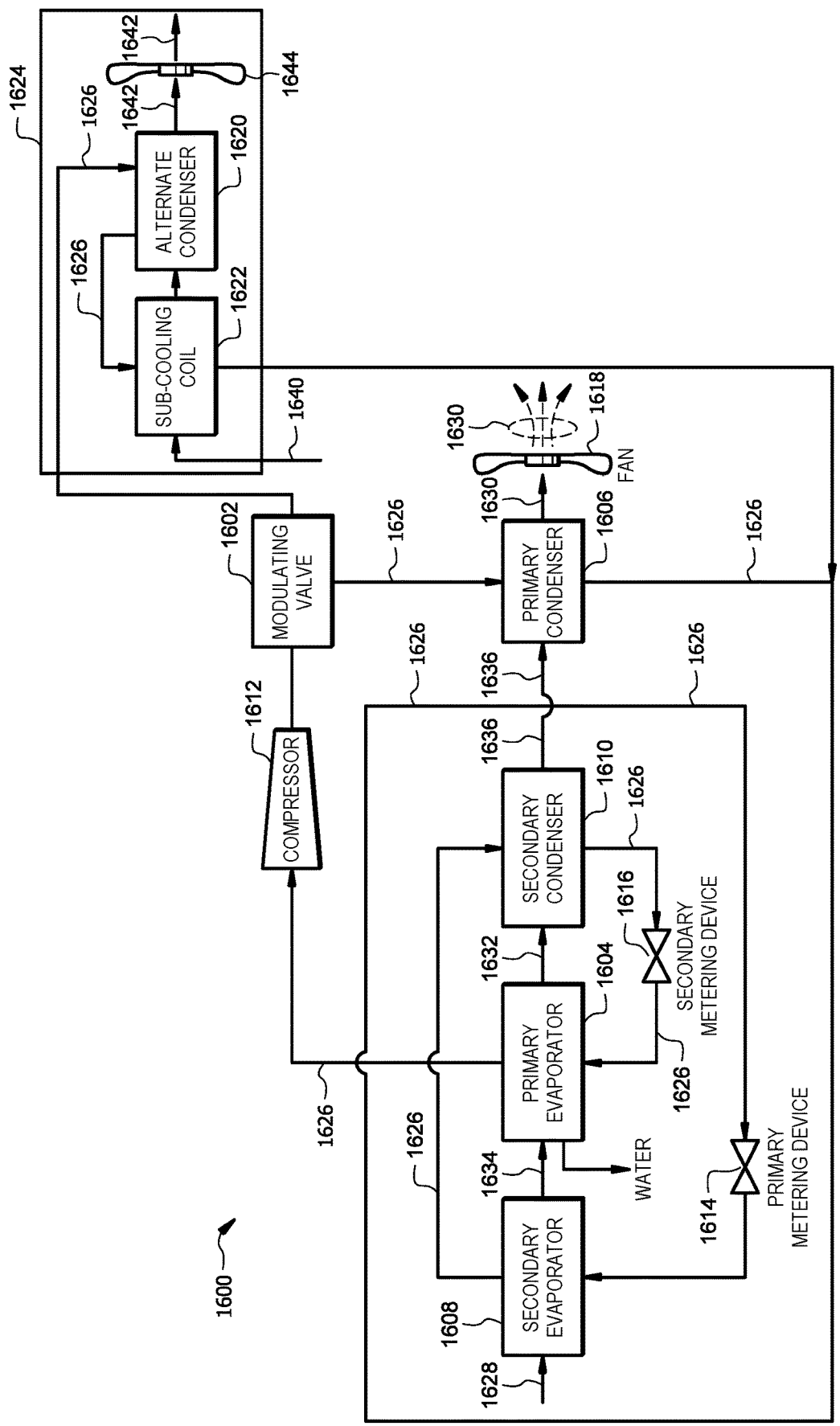
FIGS. 16A, 16B, 16C, and 16D illustrate an example dehumidification system with a modulating valve, according to certain embodiments.
Figure 16B:
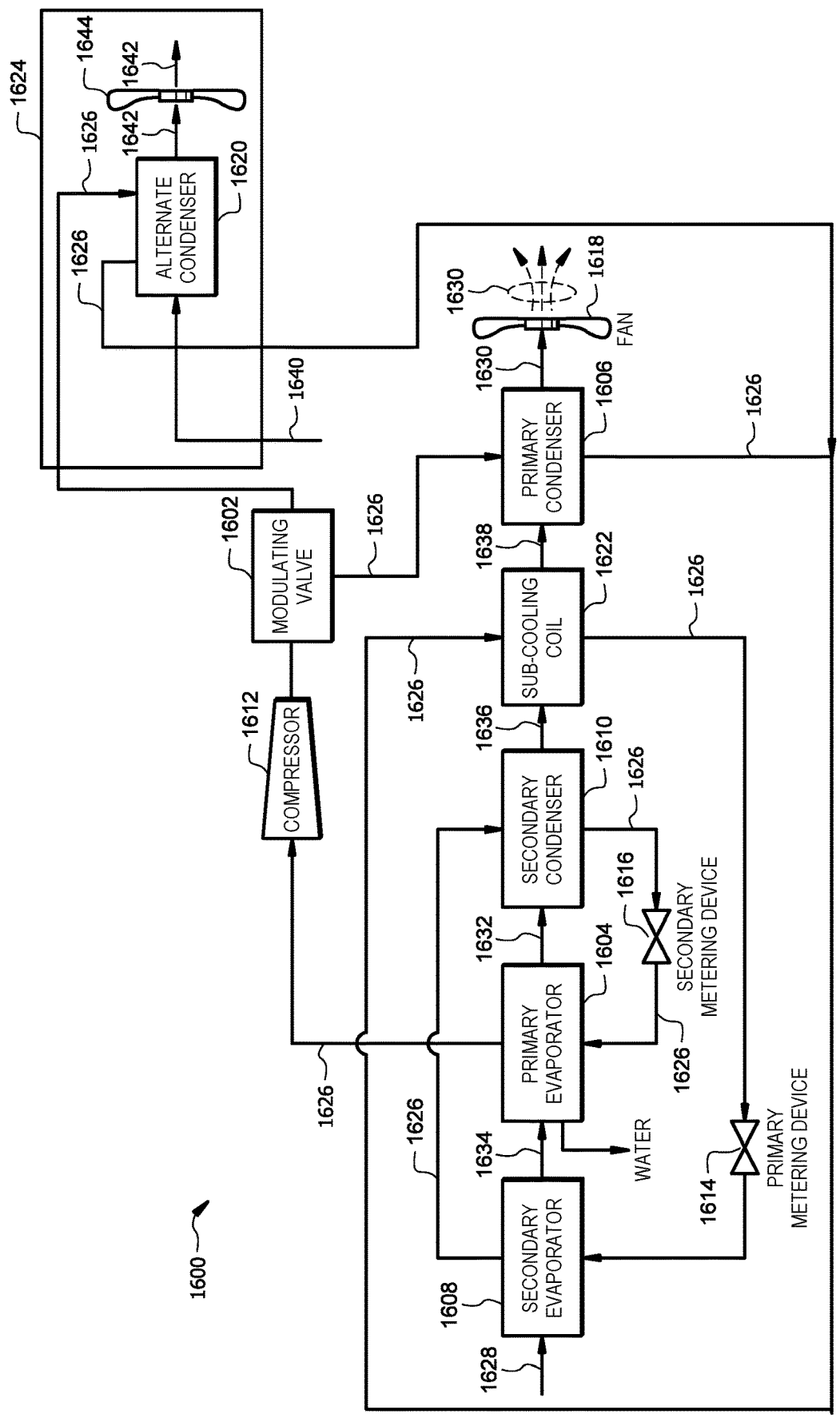
Figure 16C:
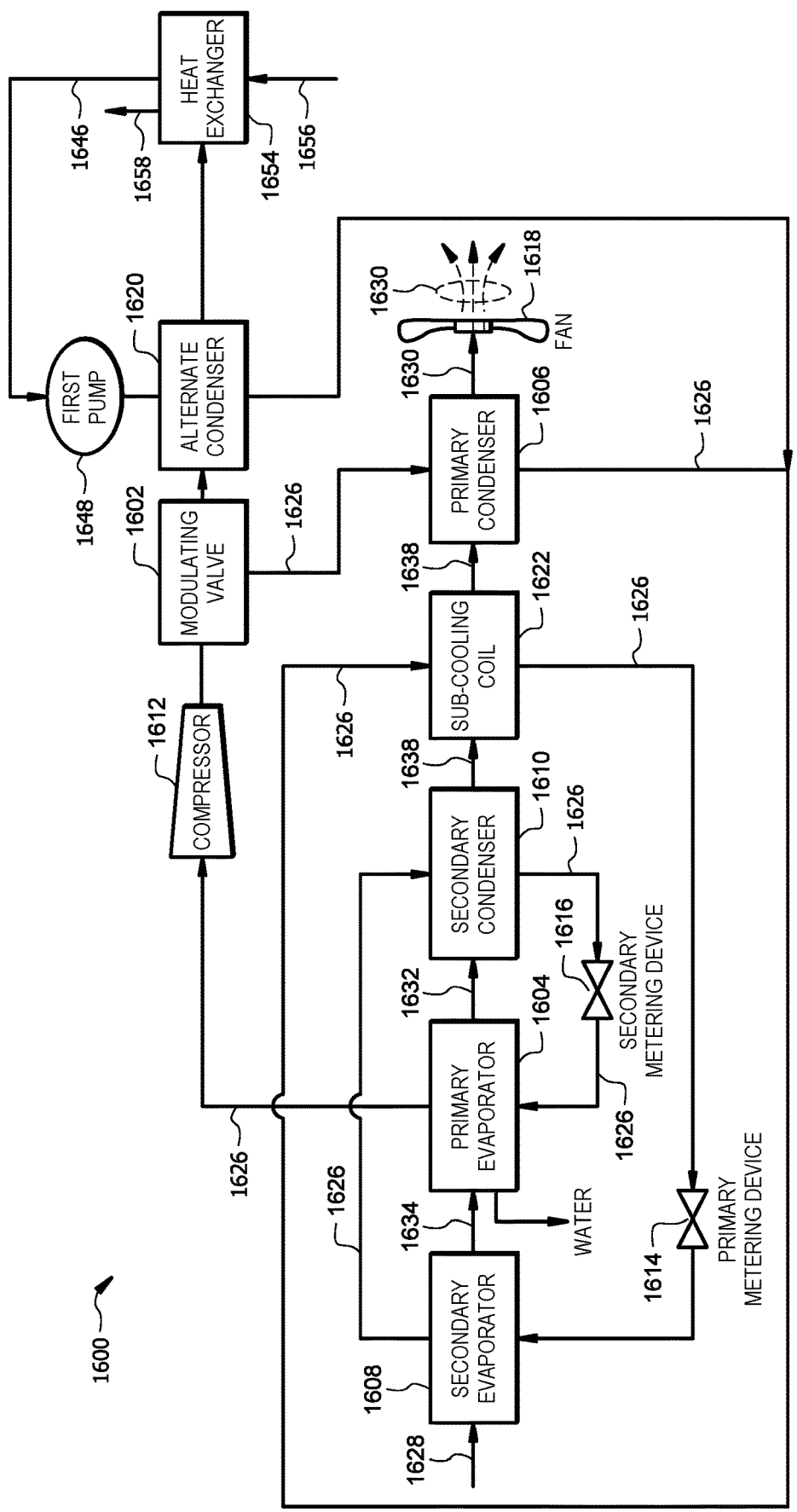
Figure 16D:
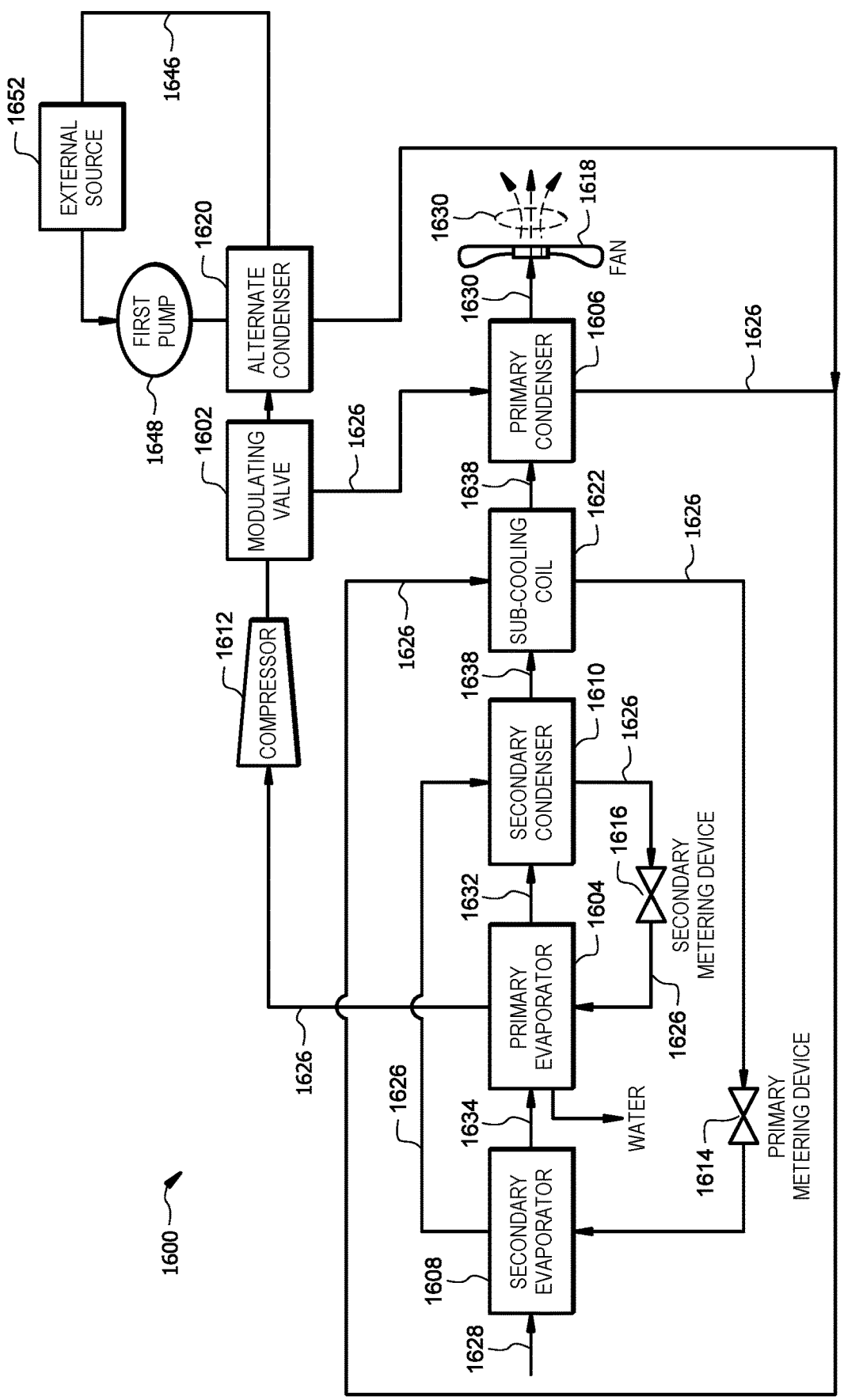

FIGS. 16A, 16B, 16C, and 16D illustrate an example dehumidification system 1600 with a modulating valve 1602 that may be used in accordance with split dehumidification system 600 of FIGS. 6A-6B to reduce humidity of an airflow. Dehumidification system 1600 includes the modulating valve 1602, a primary evaporator 1604, a primary condenser 1606, a secondary evaporator 1608, a secondary condenser 1610, a compressor 1612, a primary metering device 1614, a secondary metering device 1616, a fan 1618, and an alternate condenser 1620. In some embodiments, dehumidification system 1600 may additionally include an optional sub-cooling coil 1622. As illustrated in FIGS. 16A-16B, the alternate condenser 1620 may be disposed in an external condenser unit 1624. With reference to FIG. 16A, the optional sub-cooling coil 1622 may be disposed in the external condenser unit 1624 with the alternate condenser 1620, wherein the sub-cooling coil 1622 and the alternate condenser 1620 may be combined into a single coil. With reference to FIG. 16B, the optional sub-cooling coil 1622 may be disposed adjacent to the primary condenser 1606, wherein sub-cooling coil 1620 and primary condenser 1606 may be combined into a single coil. FIGS. 16C-16D illustrate an embodiment of dehumidification system 1600 wherein both optional sub-cooling coil 1622 and alternate condenser 1620 are not in the external condenser unit 1624 and where alternate condenser 1620 is liquid-cooled.

With reference to each of FIGS. 16A-16D, a flow of refrigerant 1626 is circulated through dehumidification system 1600 as illustrated. In general, dehumidification system 1600 receives inlet airflow 1628, removes water from inlet airflow 1628, and discharges dehumidified air 1630. Water is removed from inlet air 1628 using a refrigeration cycle of flow of refrigerant 1626. By including secondary evaporator 1608 and secondary condenser 1610, however, dehumidification system 1600 causes at least part of the flow of refrigerant 1626 to evaporate and condense twice in a single refrigeration cycle. This increases the refrigeration capacity over typical systems without adding any additional power to the compressor, thereby increasing the overall dehumidification efficiency of the system.

In general, dehumidification system 1600 attempts to match the saturating temperature of secondary evaporator 1608 to the saturating temperature of secondary condenser 1610. The saturating temperature of secondary evaporator 1608 and secondary condenser 1610 generally is controlled according to the equation: (temperature of inlet air 1628+ temperature of a second airflow 1632)/2. As the saturating temperature of secondary evaporator 1608 is lower than inlet air 1628, evaporation happens in secondary evaporator 1608. As the saturating temperature of secondary condenser 1610 is higher than second airflow 1632, condensation happens in the secondary condenser 1610. The amount of refrigerant 1626 evaporating in secondary evaporator 1608 is substantially equal to that condensing in secondary condenser 1610.

Primary evaporator 1604 receives flow of refrigerant 1626 from secondary metering device 1616 and outputs flow of refrigerant 1626 to compressor 1612. Primary evaporator 1604 may be any type of coil (e.g., fin tube, micro channel, etc.). Primary evaporator 1604 receives a first airflow 1634 from secondary evaporator 1608 and outputs second airflow 1632 to secondary condenser 1610. Second airflow 1632, in general, is at a cooler temperature than first airflow 1634. To cool incoming first airflow 1634, primary evaporator 1604 transfers heat from first airflow 1634 to flow of refrigerant 1626, thereby causing flow of refrigerant 1626 to evaporate at least partially from liquid to gas. This transfer of heat from first airflow 1634 to flow of refrigerant 1626 also removes water from first airflow 1634.

Secondary condenser 1610 receives flow of refrigerant 1626 from secondary evaporator 1608 and outputs flow of refrigerant 1626 to secondary metering device 1616. Secondary condenser 1610 may be any type of coil (e.g., fin tube, micro channel, etc.). Secondary condenser 1610 receives second airflow 1632 from primary evaporator 1604 and outputs a third airflow 1636. Third airflow 1636 is, in general, warmer and drier (i.e., the dew point will be the same but relative humidity will be lower) than second airflow 1632. Secondary condenser 1610 generates third airflow 1632 by transferring heat from flow of refrigerant 1626 to second airflow 1632, thereby causing flow of refrigerant 1626 to condense at least partially from gas to liquid.

Primary condenser 1606 may be any type of coil (e.g., fin tube, micro channel, etc.). Primary condenser 1606 is operable to receive flow of refrigerant 1626 from modulating valve 1602 and outputs flow of refrigerant 1626 to either primary metering device 1614 or sub-cooling coil 1622. As shown in FIG. 16A, primary condenser 1606 outputs flow of refrigerant 1626 to primary metering device 1614. In these embodiments, primary condenser 1606 receives third airflow 1636 and outputs dehumidified air 1630. But with reference to FIGS. 16B-16D, primary condenser 1606 outputs flow of refrigerant 1626 to the optional sub-cooling coil 1622 before the flow of refrigerant 1626 flows to primary metering device 1614. In these embodiments, primary condenser 1606 receives a fourth airflow 1638 generated by the sub-cooling col 1622 and outputs dehumidified air 1630. With reference to each of FIGS. 16A-16D, dehumidified air 1630 is, in general, warmer and drier (i.e., have a lower relative humidity) than either third airflow 1636 or fourth airflow 1638. Primary condenser 1606 generates dehumidified air 1630 by transferring heat away from flow of refrigerant 1626, thereby causing flow of refrigerant 1626 to condense at least partially from gas to liquid. In some embodiments, primary condenser 1606 completely condenses flow of refrigerant 1626 to a liquid (i.e., 100% liquid). In other embodiments, primary condenser 1606 partially condenses flow of refrigerant 1626 to a liquid (i.e., less than 100% liquid.

Secondary evaporator 1608 receives flow of refrigerant 1626 from primary metering device 1614 and outputs flow of refrigerant 1626 to secondary condenser 1610. Secondary evaporator 1608 may be any type of coil (e.g., fin tube, micro channel, etc.). Secondary evaporator 1608 receives inlet air 1628 and outputs first airflow 1634 to primary evaporator 1604. First airflow 1634, in general, is at a cooler temperature than inlet air 1628. To cool incoming inlet air 1628, secondary evaporator 1608 transfers heat from inlet air 1608 to flow of refrigerant 1626, thereby causing flow of refrigerant 1626 to evaporate at least partially from liquid to gas.

Sub-cooling coil 1622, which is an optional component of dehumidification system 1600, sub-cools the liquid refrigerant 1626 as it leaves the primary condenser 1606, the alternate condenser 1620, or combinations thereof. In embodiments wherein the sub-cooling coil 1622 is disposed within the external condenser unit 1624, the sub-cooling coil 1622 may receive refrigerant 1626 as it leaves the alternate condenser 1620, as seen in FIG. 16A. In embodiments wherein the sub-cooling coil 1622 is disposed adjacent to the primary condenser 1606, the sub-cooling coil 1622 may receive refrigerant 1626 as it leaves the primary condenser 1606 and/or the alternate condenser 1620, as seen in FIGS. 16B-16D. With reference to each of FIGS. 16A-16D, this, in turn, supplies primary metering device 1614 with a liquid refrigerant that is up to 30 degrees (or more) cooler than before it enters sub-cooling coil 1622. For example, if flow of refrigerant 1626 entering sub-cooling coil 1622 is 340 psig/105° F./60% vapor, flow of refrigerant 1626 may be 340 psig/80° F./0% vapor as it leaves sub-cooling coil 1622. The sub-cooled refrigerant 1626 has a greater heat enthalpy factor as well as a greater density, which results in reduced cycle times and frequency of the evaporation cycle of flow of refrigerant 1626. This results in greater efficiency and less energy use of dehumidification system 1600.

Compressor 1612 pressurizes flow of refrigerant 1626, thereby increasing the temperature of refrigerant 1626. For example, if flow of refrigerant 1626 entering compressor 1612 is 128 psig/52° F./100% vapor, flow of refrigerant 1626 may be 340 psig/150° F./100% vapor as it leaves compressor 1612. Compressor 1612 receives flow of refrigerant 1626 from primary evaporator 1604 and supplies the pressurized flow of refrigerant 1626 to modulating valve 1602.

Modulating valve 1602 is operable to receive the pressurized flow of refrigerant 1626 from compressor 1612 and to direct the flow of refrigerant to primary condenser 1606, to alternate condenser 1620, or to both. In embodiments, the modulating valve 1602 may operate based, at least in part, on a pre-determined temperature set point for the dehumidified airflow 1630 and on an actual temperature of the dehumidified airflow 1630 output by dehumidification system 1600. Dehumidification system 1600 may utilize modulating valve 1602 to direct heat to be rejected from the flow of refrigerant 1626 away from the primary condenser 1606 and towards the alternate condenser 1620. Depending on a feedback loop comprising of the pre-determined temperature set point and the actual temperature of the dehumidified airflow 1630, modulating valve 1602 may be configured to partially open and/or close to direct at least a portion of the flow of refrigerant 1626 to the alternate condenser 1620 and direct a remaining portion of the flow of refrigerant 1626 to the primary condenser 1606.

During operation of dehumidification system 1600, the modulating valve 1602 may direct the flow of refrigerant 1626 to primary condenser 1606 if the temperature of the dehumidified airflow 1630 output by the primary condenser 1606 does not exceed the pre-determined temperature set point monitored by the dehumidification system 1600. If the temperature of the dehumidified airflow 1630 is greater than the pre-determined temperature set point, the modulating valve 1602 may be actuated to direct at least a portion of the flow of refrigerant 1626 to the alternate condenser 1620 and direct a remaining portion of the flow of refrigerant to the primary condenser 1606. As the dehumidification system 1600 operates, reduction in the volume of flow of refrigerant 1626 to primary condenser 1606 may reduce the available heat to be rejected into the dehumidified airflow 1630. With the reduced flow of refrigerant 1626 passing through primary condenser 1606 (for example, the remaining portion of the flow of refrigerant), the rate of heat transfer to the dehumidified airflow 1630 may subsequently be reduced, thereby producing a reduction in the temperature change of an incoming airflow and the output dehumidified airflow 1630. Once the temperature of the dehumidified airflow 1630 is lower than the pre-determined temperature set point, the modulating valve 1602 may be actuated to direct the at least a portion of the flow of refrigerant 1626 back to the primary condenser 1606. Any remaining refrigerant 1626 that had been directed to alternate condenser 1620 may combine with the flow of refrigerant 1626 further downstream.

With reference to FIGS. 16A and 16B, alternate condenser 1620 may be disposed in the external condenser unit 1624 and may be any type of coil (e.g., fin tube, micro channel, etc.) operable to receive flow of refrigerant 1626 from modulating valve 1602 and output flow of refrigerant 1626 at a lower temperature. Alternate condenser 1620 transfers heat from flow of refrigerant 1626, thereby causing flow of refrigerant 1626 to condense at least partially from gas to liquid. In some embodiments, alternate condenser 1620 completely condenses flow of refrigerant 1626 to a liquid (i.e., 100% liquid). In other embodiments, alternate condenser 1620 partially condenses flow of refrigerant 1626 to a liquid (i.e., less than 100% liquid). As seen in FIG. 16A, the flow of refrigerant 1626 may be output to sub-cooling coil 1622 disposed adjacent to alternate condenser 1620 within the external condenser unit 1624. Alternate condenser 1620 and sub-cooling coil 1622 may receive a first outdoor airflow 1640 and output a second outdoor airflow 1642. Second outdoor airflow 1642 is, in general, warmer (i.e., have a lower relative humidity) than first outdoor airflow 1640. In other embodiments, as shown in FIG. 16B, the first outdoor airflow 1640 may be received by the alternate condenser 1620 without previously flowing through sub-cooling coil 1622. In FIG. 16B, the external condenser unit 1624 may include the alternate condenser 1620 and a fan 1644 and may not include the sub-cooling coil 1622, wherein fan 1644 may be configured to facilitate flow of first outdoor airflow 1640 towards alternate condenser 1620.

With reference now to FIGS. 16C-16D, alternate condenser 1620 may be any type of liquid-cooled heat exchanger operable to transfer heat from the flow of refrigerant 1626 to the flow of a fluid 1646, wherein the alternate condenser 1620 receives flow of refrigerant 1626 from modulating valve 1602 and outputs flow of refrigerant 1626 to sub-cooling coil 1622. In embodiments, the fluid 1646 may be any suitable fluid, such as water or a mixture of water and glycol. Alternate condenser 1620 receives both the flow of fluid 1646 and the flow of refrigerant 1626 during operation of dehumidification system 1600, wherein the alternate condenser 1620 is operable to transfer heat from the flow of refrigerant 1626, thereby causing flow of refrigerant 1626 to condense at least partially from gas to liquid. In some embodiments, alternate condenser 1620 completely condenses flow of refrigerant 1626 to a liquid (i.e., 100% liquid). In other embodiments, alternate condenser 1620 partially condenses flow of refrigerant 1626 to a liquid (i.e., less than 100% liquid).

As illustrated in FIGS. 16C-16D, the dehumidification system 1600 may further comprise a first water pump 1648. The first water pump 1648 may be disposed external to the alternate condenser 1620. The first water pump may be any suitable device operable to provide for the flow of fluid 1646. As depicted in FIG. 16C, the first water pump 1648 may be disposed at any suitable location between the alternate condenser 1620 and a heat exchanger 1654 operable to cycle the flow of fluid 1646 between the heat exchanger 1654 and the alternate condenser 1620. As depicted in FIG. 16D, the first water pump 1648 may be disposed at any suitable location between the alternate condenser 1620 and an external source 1652 operable to cycle the flow of fluid 1646 between the external source 1652 and the alternate condenser 1620.

With reference to FIG. 16C, heat exchanger 1654 may receive the flow of fluid 1646 from alternate condenser 1620 and output flow of fluid 1646 after transferring heat away from the flow of fluid 1646. Heat exchanger 1654 may be any suitable type of heat exchanger, such as a cooling tower or a dry cooler. Heat exchanger 1654 receives the flow of fluid 1646 and a first outdoor airflow 1656, wherein heat is transferred between the flow of fluid 1646 and the first outdoor airflow 1656. Heat exchanger 1654 may further output the flow of fluid 1646 and a second outdoor airflow 1658, wherein the flow of fluid 1646 leaving the heat exchanger 1654 is at a lower temperature than the flow of fluid 1646 received by the heat exchanger 1654, and the second outdoor airflow 1658 is at a greater temperature than the first outdoor airflow 1654.

In embodiments wherein the heat exchanger 1654 is a cooling tower, the heat exchanger 1654 may be operable to dispense the flow of fluid 1646 within its internal structure, wherein the fluid 1646 directly contacts the first outdoor airflow 1656 as the fluid 1646 flows through the heat exchanger 1654 and transfers heat to the first outdoor airflow 1656. At least a portion of the fluid 1646 may evaporate and exit to the atmosphere as the heat transfers from the fluid 1646 to the first outdoor airflow 1656, and the heat exchanger 1654 may collect a remaining portion of the fluid 1646 after transferring heat to the first outdoor airflow 1656, wherein the remaining portion of the fluid 1646 is at a lower temperature. In embodiments wherein the heat exchanger 1654 is a dry cooler, the heat exchanger 1654 may be operable to induce the first outdoor airflow 1656 to flow through the heat exchanger 1654 where heat transfers indirectly between the first outdoor airflow 1656 and the flow of fluid 1646. In these embodiments, heat transfer would not result in loss of a portion of the fluid 1646 through evaporation to the atmosphere.

With reference to FIG. 16D, external source 1652 may receive the flow of fluid 1646 and output flow of fluid 1646 to the alternate condenser 1620 via first water pump 1648. External source 1652 may be configured to contain and/or store a volume of fluid 1646 to be used by alternate condenser 1620 to lower the temperature of the flow of refrigerant 1626 in the dehumidification system 1600. Without limitations, the external source 1652 may be selected from a group consisting of a ground reservoir, a natatorium, an outdoor body of water, and any combinations thereof. In embodiments wherein the external source 1652 is a ground reservoir, the external source 1652 may implement an open or closed ground water system, wherein the conduit providing for the flow of fluid 1646 within the ground reservoir may be disposed substantially parallel to a horizontal plane of the ground surface, substantially perpendicular to the horizontal plane of the ground surface, or combinations thereof.

In embodiments wherein the external source 1652 is a natatorium, the external source 1652 may be within a multi-loop system operable to contain and cool the flow of fluid 1646 before the alternate condenser 1620 uses the flow of fluid 1646 to lower the temperature of the flow of refrigerant 1626. The external source 1652 may be configured to receive the flow of fluid 1646 from alternate condenser 1620 at a first temperature and output flow of fluid 1646 to alternate condenser 1620 at a second temperature after transferring heat away from the flow of fluid 1646, wherein the second temperature is lower than the first temperature. External source 1652 receives the flow of fluid 1646 and may receive a flow of a secondary fluid (not shown), wherein heat is transferred between the flow of fluid 1646 and the flow of secondary fluid. External source 1652 may then output the flow of fluid 1646 and the flow of secondary fluid, wherein the flow of fluid 1646 leaving the external source 1652 is at a lower temperature than the flow of fluid 1646 received by the external source 1652, and wherein the flow of secondary fluid leaving the external source 1652 is at a greater temperature than the flow of secondary fluid received by the external source 1652.

The flow of secondary fluid may then be directed to a tertiary condenser (not shown). The tertiary condenser receives the flow of secondary fluid from external source 1652 and outputs flow of secondary fluid back to the external source 1652 at a lower temperature. The tertiary condenser may be any type of air-cooled or liquid-cooled heat exchanger operable to transfer heat away from the flow of secondary fluid. In embodiments, a second pump (not shown) may be at any suitable position in relation to the external source 1652 and the tertiary condenser operable to cycle the flow of secondary fluid between the external source 1652 and the tertiary condenser, wherein the second pump may be any suitable device operable to provide for the flow of secondary fluid.

Referring back to each of FIGS. 16A-16D, fan 1618 may include any suitable components operable to draw inlet air 1628 into dehumidification system 1600 and through secondary evaporator 1608, primary evaporator 1604, secondary condenser 1610, sub-cooling coil 1622, and primary condenser 1606. Fan 1618 may be any type of air mover (e.g., axial fan, forward inclined impeller, and backward inclined impeller, etc.). For example, fan 1618 may be a backward inclined impeller positioned adjacent to primary condenser 1606 as illustrated in FIGS. 16A-16D. While fan 1618 is depicted in FIGS. 16A-16D as being located adjacent to primary condenser 1606, it should be understood that fan 1618 may be located anywhere along the airflow path of dehumidification system 1600. For example, fan 1618 may be positioned in the airflow path of any one of airflows 1628, 1634, 1632, 1636, 1638, or 1630. Moreover, dehumidification system 1600 may include one or more additional fans positioned within any one or more of these airflow paths. Similarly, with reference to FIGS. 16A-16B, while a fan 1644 of external condenser unit 1624 is depicted as being located above alternate condenser 1620, it should be understood that fan 1644 may be located anywhere (e.g., above, below, beside) with respect to alternate condenser 1620 and optional sub-cooling coil 1622, so long as fan 1644 is appropriately positioned and configured to facilitate flow of first outdoor airflow 1640 towards alternate condenser 1620.

Primary metering device 1614 and secondary metering device 1616 are any appropriate type of metering/expansion device. In some embodiments, primary metering device 1614 is a thermostatic expansion valve (TXV) and secondary metering device 1616 is a fixed orifice device (or vice versa). In certain embodiments, metering devices 1614 and 1616 remove pressure from flow of refrigerant 1626 to allow expansion or change of state from a liquid to a vapor in evaporators 1604 and 1608. The high-pressure liquid (or mostly liquid) refrigerant entering metering devices 1614 and 1616 is at a higher temperature than the liquid refrigerant 1626 leaving metering devices 1614 and 1616. For example, if flow of refrigerant 1626 entering primary metering device 1614 is 340 psig/80° F./0% vapor, flow of refrigerant 1626 may be 196 psig/68° F./5% vapor as it leaves primary metering device 1614. As another example, if flow of refrigerant 1626 entering secondary metering device 1616 is 196 psig/68° F./4% vapor, flow of refrigerant 1626 may be 128 psig/44° F./14% vapor as it leaves secondary metering device 1616.

Refrigerant 1626 may be any suitable refrigerant such as R410a. In general, dehumidification system 1600 utilizes a closed refrigeration loop of refrigerant 1626 that passes from compressor 1612 through modulating valve 1602, primary condenser 1612 and/or alternate condenser 1620, (optionally) sub-cooling coil 1622, primary metering device 1614, secondary evaporator 1608, secondary condenser 1610, secondary metering device 1616, and primary evaporator 1604. Compressor 1612 pressurizes flow of refrigerant 1626, thereby increasing the temperature of refrigerant 1626. Primary and secondary condensers 1606 and 1610, which may include any suitable heat exchangers, cool the pressurized flow of refrigerant 1626 by facilitating heat transfer from the flow of refrigerant 1626 to the respective airflows passing through them (i.e., third or fourth airflow 1636, 1638 and second airflow 1632). Further, alternate condenser 1620, which may include any suitable heat exchanger, cools the pressurized flow of refrigerant 1626 by facilitating heat transfer from the flow of refrigerant 1626 to either the airflow passing through it (i.e., first outdoor airflow 1640 as illustrated in FIGS. 16A-16B) or to the flow of fluid provided by the external source 1652 passing through it (i.e., flow of fluid 1646 as illustrated in FIGS. 16C-16D). The cooled flow of refrigerant 1626 leaving primary and/or alternate condensers 1606 and 1620 may enter primary metering device 1614, which is operable to reduce the pressure of flow of refrigerant 1626, thereby reducing the temperature of flow of refrigerant 1626. The cooled flow of refrigerant 1626 leaving secondary condenser 1610 may enter secondary metering device 1616, which is operable to reduce the pressure of flow of refrigerant 1626, thereby reducing the temperature of flow of refrigerant 1626. Primary and secondary evaporators 1604 and 1608, which may include any suitable heat exchanger, receive flow of refrigerant 1626 from secondary metering device 1616 and primary metering device 1614, respectively. Primary and secondary evaporators 1604 and 1608 facilitate the transfer of heat from the respective airflows passing through them (i.e., inlet air 1628 and first airflow 1634) to flow of refrigerant 1626. Flow of refrigerant 1626, after leaving primary evaporator 1604, passes back to compressor 1612, and the cycle is repeated.

In certain embodiments, the above-described refrigeration loop may be configured such that evaporators 1604 and 1608 operate in a flooded state. In other words, flow of refrigerant 1626 may enter evaporators 1604 and 1608 in a liquid state, and a portion of flow of refrigerant 1626 may still be in a liquid state as it exits evaporators 1604 and 1608. Accordingly, the phase change of flow of refrigerant 1626 (liquid to vapor as heat is transferred to flow of refrigerant 1626) occurs across evaporators 1604 and 1608, resulting in nearly constant pressure and temperature across the entire evaporators 1604 and 1608 (and, as a result, increased cooling capacity).

In operation of example embodiments of dehumidification system 1600, inlet air 1628 may be drawn into dehumidification system 1600 by fan 1618. Inlet air 1628 passes though secondary evaporator 1608 in which heat is transferred from inlet air 1628 to the cool flow of refrigerant 1626 passing through secondary evaporator 1608. As a result, inlet air 1628 may be cooled. As an example, if inlet air 1628 is 80° F./60% humidity, secondary evaporator 1608 may output first airflow 1634 at 70° F./84% humidity. This may cause flow of refrigerant 1626 to partially vaporize within secondary evaporator 1608. For example, if flow of refrigerant 1626 entering secondary evaporator 1608 is 196 psig/68° F./5% vapor, flow of refrigerant 1626 may be 196 psig/68° F./38% vapor as it leaves secondary evaporator 1608.

The cooled inlet air 1628 leaves secondary evaporator 1608 as first airflow 1634 and enters primary evaporator 1604. Like secondary evaporator 1608, primary evaporator 1604 transfers heat from first airflow 1634 to the cool flow of refrigerant 1626 passing through primary evaporator 1604. As a result, first airflow 1634 may be cooled to or below its dew point temperature, causing moisture in first airflow 1634 to condense (thereby reducing the absolute humidity of first airflow 1634). As an example, if first airflow 1634 is 70° F./84% humidity, primary evaporator 1604 may output second airflow 1632 at 54° F./98% humidity. This may cause flow of refrigerant 1626 to partially or completely vaporize within primary evaporator 1604. For example, if flow of refrigerant 1626 entering primary evaporator 1604 is 128 psig/44° F./14% vapor, flow of refrigerant 1626 may be 128 psig/52° F./100% vapor as it leaves primary evaporator 1604.

The cooled first airflow 1634 leaves primary evaporator 1604 as second airflow 1632 and enters secondary condenser 1610. Secondary condenser 1610 facilitates heat transfer from the hot flow of refrigerant 1626 passing through the secondary condenser 1610 to second airflow 1632. This reheats second airflow 1632, thereby decreasing the relative humidity of second airflow 1632. As an example, if second airflow 1632 is 54° F./98% humidity, secondary condenser 1610 may output third airflow 1636 at 65° F./68% humidity. This may cause flow of refrigerant 1626 to partially or completely condense within secondary condenser 1610. For example, if flow of refrigerant 1626 entering secondary condenser 1610 is 196 psig/68° F./38% vapor, flow of refrigerant 1626 may be 196 psig/68° F./4% vapor as it leaves secondary condenser 1610.

In some embodiments, the dehumidified second airflow 1632 leaves secondary condenser 1610 as third airflow 1636 and enters primary condenser 1606, as illustrated in FIG. 16A. Primary condenser 1606 facilitates heat transfer from the hot flow of refrigerant 1626 passing through the primary condenser 1606 to third airflow 1636. This further heats third airflow 1636, thereby further decreasing the relative humidity of third airflow 1636. As an example, if third airflow 1636 is 65° F./68% humidity, primary condenser 1606 may output dehumidified air 1630 at 102° F./19% humidity. This may cause flow of refrigerant 1626 to partially or completely condense within primary condenser 1606. For example, if flow of refrigerant 1626 entering primary condenser 1606 is 340 psig/150° F./100% vapor, flow of refrigerant 1626 may be 340 psig/105° F./60% vapor as it leaves primary condenser 1606.

As described above, some embodiments of dehumidification system 1600 may include a sub-cooling coil 1622 in the airflow between secondary condenser 1610 and primary condenser 1606, as best seen in FIGS. 16B-16D. Sub-cooling coil 1622 facilitates heat transfer from the hot flow of refrigerant 1626 passing through sub-cooling coil 1622 to third airflow 1636. This further heats third airflow 1636, thereby further decreasing the relative humidity of third airflow 1636. As an example, if third airflow 1636 is 65° F./68% humidity, sub-cooling coil 1622 may output fourth airflow 1638 at 81° F./37% humidity. This may cause flow of refrigerant 1626 to partially or completely condense within sub-cooling coil 1622. For example, if flow of refrigerant 1626 entering sub-cooling coil 1622 is 340 psig/150° F./60% vapor, flow of refrigerant 1626 may be 340 psig/80° F./0% vapor as it leaves sub-cooling coil 1622. In these embodiments, the fourth airflow 1638 may then undergo heat transfer in primary condenser 1606 to produce dehumidified airflow 1630.

Some embodiments of dehumidification system 1600 may include a controller that may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, the controller may include any suitable combination of software, firmware, and hardware.

The controller may additionally include one or more processing modules. Each processing module may each include one or more microprocessors, controllers, or any other suitable computing devices or resources and may work, either alone or with other components of dehumidification system 1600, to provide a portion or all of the functionality described herein. The controller may additionally include (or be communicatively coupled to via wireless or wireline communication) computer memory. The memory may include any memory or database module and may take the form of volatile or non-volatile memory, including, without limitation, magnetic media, optical media, random access memory (RAM), read-only memory (ROM), removable media, or any other suitable local or remote memory component.

Although particular implementations of dehumidification system 1600 are illustrated and primarily described, the present disclosure contemplates any suitable implementation of dehumidification system 1600, according to particular needs. Moreover, although various components of dehumidification system 1600 have been depicted as being located at particular positions and relative to one another, the present disclosure contemplates those components being positioned at any suitable location, according to particular needs.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A dehumidification system comprising:
 a dehumidification unit comprising:
  a primary metering device;
  a secondary metering device;
  a secondary evaporator operable to:
   receive a flow of refrigerant from the primary metering device; and
   receive an inlet airflow and output a first airflow, the first airflow comprising cooler air than the inlet airflow, the first airflow generated by transferring heat from the inlet airflow to the flow of refrigerant as the inlet airflow passes through the secondary evaporator;
  a primary evaporator operable to:
   receive the flow of refrigerant from the secondary metering device; and
   receive the first airflow and output a second airflow, the second airflow comprising cooler air than the first airflow, the second airflow generated by transferring heat from the first airflow to the flow of refrigerant as the first airflow passes through the primary evaporator;
  a secondary condenser operable to:
   receive the flow of refrigerant from the secondary evaporator; and
   receive the second airflow and output a third airflow, the third airflow comprising warmer air with a lower relative humidity than the second airflow, the third airflow generated by transferring heat from the flow of refrigerant to the third airflow as the second airflow passes through the secondary condenser; and a compressor operable to:
receive the flow of refrigerant from the primary evaporator and provide the flow of refrigerant to a primary condenser, the flow of refrigerant provided to the primary condenser comprising a higher pressure than the flow of refrigerant received at the compressor; and a condenser unit comprising:
the primary condenser operable to:
receive the flow of refrigerant from the compressor; and
transfer heat from the flow of refrigerant to a fourth airflow as the fourth airflow contacts the primary condenser.

2. The dehumidification system of claim 1, wherein the condenser unit further comprises a sub-cooling coil operable to:
receive the flow of refrigerant from the primary condenser;
output the flow of refrigerant to the primary metering device; and
transfer heat from the flow of refrigerant to a first outdoor airflow as the first outdoor airflow contacts the sub-cooling coil.

3. The dehumidification system of claim 2, wherein the sub-cooling coil and the primary condenser are combined in a single coil unit.

4. The dehumidification system of claim 1, wherein the fourth airflow comprises warmer air than the first outdoor airflow.

5. The dehumidification system of claim 1, wherein the dehumidification unit further comprises a sub-cooling coil operable to:
receive the flow of refrigerant from the primary condenser;
output the flow of refrigerant to the primary metering device; and
receive the third airflow and output a dehumidified airflow, the dehumidified airflow comprising warmer and less humid air than the third airflow, the dehumidified airflow generated by transferring heat from the flow of refrigerant to the dehumidified airflow as the third airflow passes through the sub-cooling coil.

6. The dehumidification system of claim 1, further comprising a first fan operable to generate the inlet, first, second, and the third airflows.

7. The dehumidification system of claim 1, wherein two or more members selected from the group consisting of the secondary evaporator, the primary evaporator, the secondary condenser, and the sub-cooling coil are combined in a single coil pack.

8. The dehumidification system of claim 1, wherein at least one of the primary evaporator and the secondary evaporator comprises two or more circuits for the flow of refrigerant.

9. The dehumidification system of claim 8, comprising at least one of passive and active metering devices operable to provide subdivided flow of refrigerant to at least one of the primary evaporator and the secondary evaporator.

10. The dehumidification system of claim 8, wherein the primary metering device and the secondary metering device are operable to provide subdivided the flow of refrigerant to the primary evaporator and the secondary evaporator.

11. The dehumidification system of claim 1, wherein the dehumidification system is operable to cause the refrigerant to evaporate twice and condense twice in one refrigeration cycle.

12. The dehumidification system of claim 1, wherein the condenser unit further comprises a second fan operable to generate a fourth airflow.

13. The dehumidification system of claim 12, wherein the second fan is operable to generate the fourth airflow at an airflow flow rate of between about 2 to about 5 times an airflow rate of the first airflow generated by a first fan.

14. A dehumidification system comprising:
a dehumidification unit comprising:
a secondary evaporator operable to receive an inlet airflow and output a first airflow, the first airflow comprising cooler air than the inlet airflow, the first airflow generated by transferring heat from the inlet airflow to a flow of refrigerant as the inlet airflow passes through the secondary evaporator;
a primary evaporator operable to receive the first airflow and output a second airflow, the second airflow comprising cooler air than the first airflow, the second airflow generated by transferring heat from the first airflow to the flow of refrigerant as the first airflow passes through the primary evaporator;
a secondary condenser operable to receive the second airflow and output a third airflow, the third airflow comprising warmer and less humid air than the second airflow, the third airflow generated by transferring heat from the flow of refrigerant to the third airflow as the second airflow passes through the secondary condenser;
a compressor operable to receive the flow of refrigerant from the primary evaporator and provide the flow of refrigerant to a condenser unit, the flow of refrigerant provided to the condenser unit comprising a higher pressure than the flow of refrigerant received at the compressor; and
a first fan operable to generate the inlet, first, second, and the third airflows; and
a condenser unit comprising:
a second fan operable to generate a fourth airflow; and
the primary condenser operable to:
receive the flow of refrigerant from the compressor; and
transfer heat from the flow of refrigerant to the fourth airflow as the fourth airflow contacts the primary condenser.

15. The dehumidification system of claim 14, wherein the condenser unit further comprises a sub-cooling coil operable to:
receive a flow of refrigerant from the primary condenser;
output the flow of refrigerant to the primary metering device; and
transfer heat from the flow of refrigerant to a first outdoor airflow as the first outdoor airflow contacts the sub-cooling coil.

16. The dehumidification system of claim 15, wherein the sub-cooling coil and primary condenser are combined in a single coil unit.

17. The dehumidification system of claim 15, wherein the fourth airflow comprises warmer air than the first outdoor airflow.

18. The dehumidification system of claim 14, wherein the dehumidification unit further comprises a sub-cooling coil operable to:
receive a flow of refrigerant from the primary condenser;

output the flow of refrigerant to the primary metering device; and receive the third airflow and output a dehumidified airflow, the dehumidified airflow comprising warmer and less humid air than the third airflow, the dehumidified airflow generated by transferring heat from the flow of refrigerant to the dehumidified airflow as the third airflow passes through the sub-cooling coil.

19. The dehumidification system of claim 14, wherein the second fan is operable to generate the fourth airflow at an airflow flow rate of between about 2 to about 5 times an airflow rate of the first airflow generated by the first fan.

20. The dehumidification system of claim 14, wherein the dehumidification system is operable to cause the refrigerant to evaporate twice and condense twice in one refrigeration cycle.

* * * * *